(12) United States Patent
Lehr

(10) Patent No.: US 7,837,954 B2
(45) Date of Patent: Nov. 23, 2010

(54) TUBE BUNDLE REACTORS WITH PRESSURE FLUID COOLING

(75) Inventor: Manfred Lehr, Deggendorf (DE)

(73) Assignee: Man DWE GmbH (DE)

( * ) Notice: Subject to any disclaimer, the term of this patent is extended or adjusted under 35 U.S.C. 154(b) by 414 days.

(21) Appl. No.: 12/128,775

(22) Filed: May 29, 2008

(65) Prior Publication Data

US 2009/0010821 A1   Jan. 8, 2009

(51) Int. Cl.
*B01J 8/04*   (2006.01)
*F28D 7/00*   (2006.01)
*F28D 1/02*   (2006.01)

(52) U.S. Cl. .................. 422/197; 422/201; 165/53; 165/56; 165/57; 165/77; 165/78; 165/104.19

(58) Field of Classification Search .................. 422/197, 422/201; 165/53, 56, 57, 77, 78, 104.19
See application file for complete search history.

(56) References Cited

U.S. PATENT DOCUMENTS

| 3,907,026 | A | * | 9/1975 | Mangus | .................. | 165/70 |
| 4,352,341 | A | * | 10/1982 | Styslinger | .................. | 122/7 R |
| 2007/0167647 | A1 | * | 7/2007 | Shin et al. | .................. | 562/523 |

FOREIGN PATENT DOCUMENTS

DE   10019381 A1   11/2001
EP   1782883 A1   9/2007
GB   1218065 A   1/1971
GB   1513069 A1   6/1978
WO   WO 2004004884 A1   1/2004

OTHER PUBLICATIONS

Office Action of German Counterpart Patent Application; Jan. 3, 2008; 5 pages.

* cited by examiner

*Primary Examiner*—Walter D Griffin
*Assistant Examiner*—Huy-Tram Nguyen
(74) *Attorney, Agent, or Firm*—Thomas & Karceki, PC

(57) ABSTRACT

A set of prefabricated tube bundle reactor subassemblies is proposed which are adapted to be assembled at a construction site to provide a tube bundle reactor for carrying out catalytic gas and/or liquid phase reactions. In accordance with the invention, the reactor shell and the reactor heads, on the one hand, and the tube bundle and the tube sheets, on the other hand, form separate subassemblies, more specifically at least one shell/head subassembly, at least one head subassembly, and at least one tube bundle subassembly. The subassemblies comprise means for vertically supporting the tube bundle subassembly and for pressure tightly connecting the shell/head subassembly to the tube sheets without requiring heat treatment during assembly of the subassemblies. Likewise proposed are a tube bundle reactor for carrying out catalytic gas and/or liquid phase reactions and an arrangement of the kind of tube bundle reactors mentioned.

35 Claims, 20 Drawing Sheets

TUBE BUNDLE REACTORS WITH PRESSURE FLUID COOLING

CROSS-REFERENCE TO RELATED APPLICATIONS

This application claims priority to German Patent Application No. 10 2007 024 934.0, filed May 29, 2007, the contents of which are incorporated herein by reference in its entirety.

FIELD OF THE INVENTION

The present invention relates to a set of prefabricated tube bundle reactor subassemblies devised for assembly at a construction site to form a tube bundle reactor for carrying out catalytic gas phase and/or liquid phase reactions. The present invention also relates to a tube bundle reactor and an arrangement of tube bundle reactors.

BACKGROUND OF THE INVENTION

Tube bundle reactors comprise a plurality of parallel reactor tubes which are arranged in a tube bundle and into which catalyst material, usually of granular nature is filled. If desired, the reactor tubes also may be filled with inert material or variously combined and arranged catalyst and inert materials. The tube bundle is surrounded by a reactor shell, usually a cylindrical one. The ends of the reactor tubes are open and firmly positioned in tube sheets with their outer walls in sealing engagement with the tube sheets. The reaction gas mixture (feed gas) is supplied to the reactor tubes through a reactor head which spans the respective tube sheet. It is discharged as product gas mixture through another reactor head spanning the other tube sheet.

In a widely used system for dissipating heat of reaction generated in a tube bundle reactor during exothermal reactions a liquid heat carrier, such as heat carrier oil or a mixture of nitrate or nitrite salts, is passed through the reactor by circulation means so that it will flow around the outside of the reactor tubes, either in a concurrent flow or as a countercurrent to the flow of reaction gas mixture. Such a system is advantageous in that it offers operation which is practically pressureless and, as a consequence, the thickness of walls can be kept relatively thin even in big reactors. Suitable flow guide means ensure good and uniform dissipation of heat throughout the reactor cross section.

Another system of dissipating heat of reaction is by way of pressure fluid cooling, often performed as cooling by evaporation, such as cooling by boiling water. In this case the heat carrier system is operated under pressure, using fluids in forced or natural circulation that evaporate partly, fully, or not at all. The preferred fluid is water. As used here, the terms "boiling water cooling" and "boiling water reactor" are merely examples of "cooling by evaporation" and "tube bundle reactor with evaporative cooling", respectively, and are not to be understood as restrictive.

With cooling by evaporation, the heat of reaction is dissipated by making use of it to evaporate part of the heat carrier. The resulting liquid-steam-mixture rises due to its low density and is passed out of the reactor to be split thereafter in a separator into a liquid phase and a steam phase. The liquid phase is returned to the reactor, while the steam phase can be utilized directly as working steam without any need for another heat carrier circuit. It is an essential advantage of this system that, at a given constant pressure, the temperature is the same everywhere in the heat carrier system as long a liquid heat carrier is present and the walls of the reactor tubes are in contact with the same. Moreover, very good heat transfer is obtained at the outer tube walls so that expenditure is negligible for flow improvement installations to enhance uniform distribution of the heat carrier. As the heat carrier evaporates in part only, the walls of the reactor tubes remain in constant contact with liquid heat carrier, whereby local overheating is avoided. Various embodiments of this type of structure are described, for example, in the following patents: U.S. Pat. No. 3,518,284, DE 2 013 297, DE 2 123 950, DE 2 420 949, DE 30 28 646, and EP 0 532 325.

For economic reasons, the aims with tube bundle reactors of the kind mentioned are to obtain large capacities, i.e. the greatest possible number of tubes and maximum useful tube volume to accommodate catalyst filling. Some reactor types require tube lengths in the order of 10 to 15 meters. Yet the desired capacity enlargement is subject to limitations imposed by the transportation environment. True, it has become possible by now to move relatively light apparatus with diameters of some 10 to 11 meters by road but, as a rule, shipment by road or rail of reactors equipped with tubes and having diameters of more than 4 to 5 meters over greater distances is impossible or forbids itself for reasons of cost. That is so, on the one hand, because of limited vertical and/or horizontal clearances or weight restrictions of bridges and the like and, on the other hand, the lack of suitable hoisting equipment at the place of reloading or the final site of erection.

Therefore, transportation of very big or very heavy reactors in parts to the construction site and assembly at the place of erection are desirable. At the same time, it is just as desirable to build the most compact tube bundle reactors which, however, still are such as to be suited for shipment in fully assembled state. As regards the first aspect, existing limitations of fabrication at a construction site make it imperative to determine the limits of weights and dimensions of individual reactor elements that will just stay within keeping of the limits imposed by transportation. In that way, the number of joints and seams can be kept as small as possible.

It should be noted also that it is very uneconomical and time consuming to equip the reactor with tubing at the construction site only, i.e. to thread the reactor tubes into the tube sheets and seal them to the tube sheets. In addition, in most cases it will not be possible to accomplish this at the site for lack of proper fabrication conditions and adequate quality assurance. Besides, the problems of dimensioning still would remain unresolved.

In the description below, designs will be discussed which relate to assembling a reactor. In particular, this will relate to reactors devised for assembly at the construction site or reactors composed of specifically defined subassemblies. Moreover, reactors will be described that are particularly compact and also reactor units that are combinations of a plurality of smaller reactors.

A tube bundle reactor to be put together at the construction site is specified, for instance, in DE 25 43 758 C3. It comprises at least two independent sectors with associated tube sheet sectors, outer shell sections, and inner wall sections including reactor tubes disposed inside the same, the respective walls of the sectors being mutually propped by spacer elements.

The individual sectors of such a tube bundle reactor can be tested for operability while still at the place of manufacture prior to being shipped because the reactor tubes will have been installed and the walls surrounding the reactor tubes define a tightly sealed space all around. It is at the erection site only that the sectors and the heads, the tube connections and the supports will be connected to one another, in the first place by welding procedures, to complete the tube bundle reactor.

This type of sectoral structure is suitable for operations in which the liquid heat carrier used is not under pressure and does not evaporate. The heat carrier space in this case is operated practically without pressure so that the thickness of the vessel walls essentially is determined by their own weight rather than by internal pressure. If such a tube bundle reactor were devised as a boiling water reactor, with a pressurized evaporating medium acting as heat carrier, the wall thickness of the reactor shell clearly would have to be greater for reasons of rigidity. Such a reactor is not suitable for the sectoral construction known from DE 25 43 758 C3. The main obstacle resides in the heat treatment after welding to which component parts with thick walls must be subjected in order to release internal tensions generated in the material by the welding process. Local heat treatment of the longitudinal connecting shell seams, that would be required with a boiling water tube bundle reactor according to DE 25 43 758 C3 delivered to the job site as several independent units having tubes already installed in them, is out of the question because of the differential thermal expansions between the reactor shell and the reactor tubes.

Further disadvantages of the sectoral construction are caused by the fact that the individual sectors dispose of quite a number of planar walls which either must be made unduly thick in view of the pressures prevailing inside the sectors or be reinforced by struts or some other kind of costly support. In addition, tension peaks caused by the internal pressure in the interior of the sector occur at the transitions between individual walls. Reactor tubes cannot be disposed in the central region of the reactor to utilize this region for reactions. Moreover, it must be sealed with respect to the upper and low reactor heads. The whole structure suffers from sealing problems and is susceptible to tension cracks, especially so if operated periodically and under frequently changing operating conditions, respectively.

EP 1 210 976 A2 describes the use of mechanical connector elements for assembling a tube sheet consisting of a plurality of tube sheet parts of a tube bundle apparatus. At the location of the joints, the tube sheet parts have complementary contours presented, for instance, as grooves and tongues which are secured to each other by pins extending through the grooves and tongues. To obtain a tight connection, the joint and the pin contours are welded together at both sides of the tube sheet. The essential advantages which this design is said to offer are smaller production machines, shorter production times, and clearly less distortion in comparison with fully welded connections throughout. Careful preparation is needed at the points of contact in such a structure. If the play is too great at the groove and tongue joint the transmission of force from one tube sheet part to another is reduced. If the play is too small pinching results and the parts cannot be joined. The bores to receive the connecting pins cannot be made until after the parts have been put together. Recesses must be formed at the counter-contours of edges so that these will not pinch. The tubes cannot be introduced and fixed in the tube sheet until after the connection has been completed. The fabrication process, therefore, must be performed at the manufacturing plant. Assembling the tube sheet parts at the job site makes little sense.

DE 1 667 187 C describes a solid bed, high pressure reactor for exothermal catalytic reactions with repeated intermediate cooling among a plurality of catalyst beds. The special feature of this reactor is a tube bundle evaporator serving as cooler. It is subdivided, arranged in the middle of the reactor, and fastened by its tube plate on the reactor head, preferably such that it can be pulled out. Having passed the reactor, the product gas exits from the reactor through a central opening in the tube plate of the first internal heat exchanger and a downstream outlet nozzle. The diameter of this type of reactor is limited due to the necessary thick walls which are needed because of the high process pressures. In this respect, therefore, a reactor described in the embodiment as having an inner diameter of 2.2 m presumably will present the upper limit. With diameters greater than that, a planar plate likewise could not be realized to serve as reactor head because of the great thickness needed. This would be even less feasible if, regardless of its shape, the reactor head were weakened by a plurality of passages for heat exchanger tube bundles. As diameters become greater, furthermore, a detachable flange connection becomes ever more problematic because of the size of the flanges and screws needed. Moreover, with greater diameters it remains unresolved how to transmit the weight load from the combination of catalyst bed and heat exchanger to the reactor shell. The requirements as to rigidity will not be met by a small projection provided within the reactor shell to serve as bearing surface, as illustrated in the embodiment, nor by the thin mounting plate at the top of the combination of catalyst bed and heat exchanger. The proposed structure is not suitable for final assembly at the construction site if the diameters of reactors are great.

DE 28 16 062 A1 describes a methanization reactor comprising a combination of solid bed and heat exchanger suspended in the reactor shell. Cooling of the reaction gas is effected exclusively by the cool feed gas entering. The entire weight load of the combination of solid bed and heat exchanger is accommodated by an upper mounting plate which is supported on and connected by screws to the upper end of the cylindrical reactor shell. A detachable screw connection interconnects the upper reactor head and the reactor shell. Product gas is led out of the reactor by an outlet duct which is sealed towards the reactor shell by a stuffing box. Compensation which would take care of different expansions in length of the cold reactor shell and the hot combination of solid bed and heat exchanger is not provided for. It is conceivable to disassemble the structure shown into its major elements, namely the reactor shell with the lower reactor head and the combination of solid bed and heat exchanger with the upper reactor head, and then ship them separately to the place of erection where they would be built together. The structure, however, is limited as to diameter for similar reasons as the solid bed, high pressure reactor known from DE 1 667 187 C. For this reason, separate shipments of individual parts to the job site and subsequent assembly there are not required. Moreover, the reactor has but one pressure space so that the design principle is not suited for application to a tube bundle reactor having separate reaction and heat carrier spaces.

Likewise known are tube bundle reactors whose tube bundle, mounted according to the floating head principle, can be taken out. The floating head principle provides for the tube sheet of one tube bundle end to be rigidly connected to the shell of the apparatus, whereas the other tube sheet is movable more or less freely. The tube bundle may be disposed either standing vertically upright or suspended, or it may be lying horizontally. A great number of variants of this design principle are specified in the respective standards, such as ASME, AD2000, or TEMA. The variants, in the first place, are concerned with how to direct the tube-side fluid out of the tube bundle. In the case of the free floating head, the tube-side fluid is deflected at the tube end so as to flow back in opposite direction. In its return flow, the tube-side fluid normally has a temperature which differs from the flow when entering and, therefore, compensation in length must be provided in the return line. The configuration of a U-tube bundle is an exception in that lengthwise compensation is effected by the U-tube bundle itself. Yet the tube-side fluid also may be passed on in the same direction through an outlet duct which leads out of the shell of the apparatus at the other end. Specifically in this case, lengthwise compensation must be provided at a suitable location.

DE 27 58 131 describes a tube bundle reactor which is used preferably for endothermal processes. The heat carrier, for example, is a heating gas which is guided around the reactor tubes by ring or disc-shaped deflector plates. The tube bundle is represented by a standing tube bundle with a floating head. An expansion joint is built into the connecting line between the floating head and the upper reactor head. The connecting line terminates at a flange in the upper reactor head, and a reactor outlet line is connected to this flange. The upper reactor head also is attached to the cylindrical reactor shell by a flange connection. A separate tube sheet head is connected to the lower tube sheet. A lower connecting line leads from the lower tube sheet head to the outlet nozzle of the lower reactor head and is welded to the same by its end. For exchange of the tube bundle, first the screw connections of the upper reactor outlet line and the upper reactor head are undone. Next, the welded connection of the lower connecting line is broken, whereupon the tube bundle can be withdrawn in upward direction. Upon completion of the maintenance or repair work, the reactor is reassembled in the opposite sequence. Although the reactor described is quite easy to dismantle, it still has the fundamental disadvantages of a floating head design. The tube side of the reactor is not sealed directly with respect to the surroundings but instead towards a second pressure space. That, of course, results in a more expensive structure, and the interior pressure envelope suffers additional strain from the surrounding medium and the pressure and temperature thereof.

A tube bundle reactor having a floating head implemented in suspended form is known from U.S. Pat. No. 5,006,131 B. It forms part of the reactor system described in that publication. An upper reactor head having gas outlet nozzles is connected to the edge of the upper tube sheet. The upper reactor head further includes a manhole nozzle. A cylindrical shell connected in downward direction to the edge of the upper tube sheet merges at its lower end into a lower reactor head. At their lower ends, the reactor tubes open into a floating head consisting of a lower tube sheet and a lower tube sheet head. An outlet line leads from the lower tube sheet head through the lower reactor head and out of the reactor. The outlet line is connected to the lower reactor head by an expansion joint located outside of the reactor. A heat carrier enters the reactor at one side and leaves it at the other, while ring or disc-shaped deflector plates guide it as it flows through the reactor, always vertically with respect to the tubes in order to enhance the heat transfer. This type of reactor is not suited for final assembly at the site of its erection because several thick sheets must be welded together. The preferred number of tubes is small, being indicated as 250 and 1000 in U.S. Pat. No. 5,006,131 B. Additionally, the observations made in the discussions above of DE 1 667 187 C regarding the problems of greater reactor diameters and of DE 27 58 131 regarding the disadvantages of a floating head design apply here as well.

DT 25 13 499 A1 describes a reforming oven which functions by heat convection and a system provided with such an oven to produce gas rich in hydrogen or synthetic gas. In principle, the reforming oven or reactor may be used in addition for many other applications. In the case of the embodiment specified, the reforming oven, referred to below as reactor, includes a multipart tube sheet to which a bundle of reactor tubes are attached. At their lower ends, the reactor tubes open into a central pipe which extends upwardly and further on through the upper reactor head to the outside of the reactor. The tube sheet, including the reactor tubes suspended from it, is fixed radially inwardly by a strong welded connection to the central pipe through which the product gas leaves the reactor, and at its outer peripheral edge it is connected by an elongate carrying member to the lower part of the upper reactor head. The elongate carrying member is relatively elastic and thus able to compensate differential radial expansions of the cylindrical shell, upper reactor head, and upper tube sheet. Such movements are intended to be reduced by an insulating layer within the multipart upper tube sheet. Since the upper reactor head is flange-connected to the major cylindrical reactor part it is easy to pull the upper reactor head out of the reactor, along with the tube sheet and reactor tubes. The design described is suitable only for small and medium reactor diameters because the entire tube bundle is suspended mainly by the central pipe. The elongate carrying member between the tube sheet and the upper reactor head can accommodate only minor forces. Separate shipment and later joining of individual reactor groups at the job site would seem to be conceivable. But to fill the tubes with granular catalyst material and, above all, to empty them again would be difficult, if at all to be fully accomplished.

A structure designed for multiple length compensation is known from EP 1 048 343 A2 which describes a tube bundle reactor having the upper ends of the reactor tubes fastened individually by expansion joints to an upper tube sheet. The lower ends of the reactor tubes are firmly connected to a lower tube sheet. The lower tube sheet is enclosed by a head to which a nozzle is connected. This nozzle in turn (at its other end) is connected to the lower reactor outlet nozzle by an expansion joint which is disposed still inside the reactor. The welding must meet high demands where an individual reactor tube is to be connected to a tube sheet with the aid of an expansion joint. It makes sense only to accomplish this kind of work at a manufacturing plant. Fabrication at the place of erection practically is excluded. Also, dividing the tube bundles including the tube sheets secured to them causes problems since the expansion joints are highly sensitive and could be damaged during transportation.

With the aim to provide a compact reactor unit, it is suggested as a possibility in EP 1 590 076 A1, for example, that on entering a tube bundle reactor devised for partial evaporation of a heat carrier, the latter be distributed uniformly around the reactor circumference by interior annular channels. In this way the number of conduits outside of the reactor is reduced to a minimum. But still, nozzles are needed radially at the circumference of the reactor shell and, as a consequence, the overall dimensions of the reactor for shipment are enlarged. This type of reactor is not suitable to be dismantled into several subassemblies for shipment.

DT 1 542 494 C3 describes a tube bundle reactor in which liquid salt is used as heat carrier. The heat carrier gives off heat which it has taken up in the tube bundle reactor through laterally protruding conduits in a heat exchanger disposed outside of the reactor, e.g. embodied by a steam generator, to be returned later into the reactor. A particular characteristic of this tube bundle reactor is the arrangement of the reactor tubes in a plurality of tube bundle sectors between which there are passageways which are free of tubes. One passageway is somewhat larger than the others so that, in addition, it can house an inlet line to the heat exchanger and an outlet line from the heat exchanger. A guide duct including a built-in impeller is disposed centrally in the tube bundle reactor and driven by an electric motor. The major part of the heat carrier conveyed downwardly by the impeller enters the space between the lower tube sheet and an orifice plate located above the same and is then distributed uniformly throughout the entire reactor cross section by means of the passageways and the orifice plate. This major amount flows upwardly around the reactor tubes and, having passed through an upper orifice plate, reenters the guide duct at the top. The residual amount of heat carrier flows through an inlet line into the heat exchanger where it gives off the heat it had taken up and flows back to the tube bundle reactor through a return line into the inlet of the central guide duct. A remarkable detail of this design is the distribution and collection, respectively, of the heat carrier centrally in the interior of the reactor, whereby expensive valve means, annular channels, and specifically devised windows for entry into the interior of the reactor can be dispensed with.

WO 2004/004884 A1 suggests a reactor system and a reactor arrangement, respectively, in which a plurality of reactor units are operated in parallel like a single reactor, dispensing with individual measuring and control means. These reactor units are operated with a common heat carrier system, preferably applying boiling water cooling in a natural circulation layout. The reaction gas is supplied through one or more conduits to two or more reactor units. For the product there is one withdrawal or several ones in common. It is preferred to use tube bundle reactors, the reactor tubes being filled with catalyst. The reactor system presented in the document offers a solution for achieving the efficiency of a very big reactor and profiting from the transportability of the individual reactors for assembling the reactor system.

It is, indeed, a widely applied principle in process engineering to connect several smaller units in parallel to obtain one bigger unit. As a rule, however, this has the disadvantage of requiring expensive distribution and collection systems and the associated piping and nozzles for supply and discharge of the reaction gases and heat carrier fluids to and from the individual units. Furthermore, each one of the smaller units must provide accessibility toward its interior, such as for catalyst replacement. Connections in parallel also involve extra expenditure caused, for instance, by supporting of the units, mutual compensation of thermal expansions, insulation, space requirement, and the surrounding steel structures. No measures are indicated in WO 2004/004884 A1 for minimizing the additional expenditure involved with connections in parallel so that it might be possible to come up with solutions which are economical.

In chemical production plants on an industrial scale it is often desired, for economic reasons, to have one big tube bundle reactor unit with as many reactor tubes as possible. But the dimensions and/or weight of big tube bundle reactors surpass the limits of transportability. Known designs of subassemblies are not suitable for tube bundle reactors with pressure fluid cooling. Besides, it is desirable, again for reasons of shipment but also for ease of assembly, that such tube bundle reactors or tube bundle reactor arrangements be compact in structure and able to function without a lot of accessory equipment.

BRIEF SUMMARY OF THE INVENTION

It is, therefore, an object of the present invention to provide a tube bundle reactor unit with pressure fluid cooling and great capacity for catalytic gas and/or liquid phase reactions, and not having its capacity limited by problems of transportation and/or assembly.

This object is met, in accordance with the invention, by a set of prefabricated tube bundle reactor subassemblies as defined in claim 1.

The object also is met, with a tube bundle reactor of the kind specified initially, by the characterizing features of claim 21.

Furthermore, the object is met, with an arrangement of the kind specified initially, by the characterizing features of claim 30.

By the measures of the invention, tube bundle reactor units with pressure fluid cooling are rendered shippable, which have greater capacities than tube bundle reactor units which could be transported up to now with their given dimensions and/or weights. Moreover, they are allowed to be assembled under conditions prevailing at construction sites while, at the same time, meeting quality requirements in correspondence with those of complete fabrication and mounting at the manufacturer's.

When "conditions prevailing at the construction site" are mentioned in the specification of the present invention, this expression is to be understood as meaning that welding of thick sheets measuring more than 38 mm in wall thickness, such as tube sheets, is excluded in view of the fact heat treatment of such sheets is mandatory under the regulations in force at present. As, for example, the tube sheets come with reactor tubes already inserted and fixed by welding, heat treatment of the tube sheets forbids itself.

Nothing but subassemblies which are separate from the reactor shell and the reactor heads make up a tube bundle with tube sheets attached thereto in a set of prefabricated tube bundle reactor subassemblies according to the invention. In other words, the reactor shell and the reactor heads form subassemblies which include no parts at all of the tube bundle and tube sheets. In this way, the reactor shell and the reactor heads can be assembled alone at first at the construction site, if necessary, and thus there will be no risk that the tube bundle and tube sheets become affected by welding seams which must be applied when mounting the reactor shell and the reactor heads. The thicknesses of the reactor shell and the reactor heads, as a rule, are such that heat treatment must be applied following the welding step. Any adjacent or nearby tube sheets would become deformed by such heat treatment in the vicinity, and they in turn then would have to undergo heat treatment. That, however, cannot be performed at the construction site nor justified for economic reasons.

The reactor shell and one reactor head, for example, the lower reactor head, thus form at least one shell/head subassembly, while the other reactor head, for example, the upper reactor head forms at least one head subassembly. At least one of these subassemblies comprises supporting means for the at least one or each tube bundle subassembly, respectively, to provide vertical support for tube bundle subassemblies. Yet the joining of tube bundle and tube sheet, respectively, with the reactor shell and reactor heads does not require any subsequent heat treatment of the parts that have become united. Preferred embodiments of the tube bundle subassemblies are specified in subclaims 2 to 6 and shown in FIG. 4. Examples of structural implementations of such connections and vertical supports, respectively, are recited in subclaims 7 to 12 and 14 to 17 and illustrated in FIGS. 2*a-d*, 5*a-b*, and 6*a-d*.

Moreover, according to the invention the at least one shell/head subassembly and/or the tube sheets are provided with sealing means to become tightly fastened to the reactor shell and the tube sheets, respectively, at the sides of the tube sheets remote from the reactor tubes and/or the peripheral edges. The sealing means are designed and arranged such that their fastening, on the one hand, can be made pressure tight and, on the other hand, does not require subjecting the tube sheets subsequently to heat treatment. Examples of the structural implementation of such sealing means are indicated in claims 8 to 20 and shown in FIGS. 2a-d and 3a-d. A pressure vessel or pressure space, therefore, can be formed, under conditions at the construction site, between tube sheets and the reactor shell and thus also a second pressure space results between the tube sheets, the reactor heads, and the reactor tubes once the tube bundle subassembly(ies) has/have been introduced into the shell/head subassembly. In other words, two pressure spaces are obtained which are directly sealed off from the surroundings. Thereby, a floating head solution with the considerable expenditure this involves is avoided.

When all the subassemblies have been combined the distance of the parting line, i.e. the assembly welding seam between the shell/head subassembly and the head subassembly, from the closest tube sheet can be smaller than with conventional structures because the thermal loading caused by the heat treatment of the assembly welding seam can be transmitted to the tube sheet to a limited extent only by the sealing means.

The tube bundle subassemblies are supported vertically on supporting means provided at the reactor shell and/or they rest on supporting means, such as radially extending ribs or a central bearing ring. The ribs may extend along the edges of division of the tube bundle subassemblies or in the inner area of the tube sheet portions thereof. The tube bundle subassemblies may be supported at the lower and/or upper tube sheet sectors. It is likewise conceivable to provide the tube sheet portions at their edges of division with vertical flanges which are screwed together to offer stiffness against forces and moments. In any case, the tube sheet portions of the tube bundle subassemblies are welded to one another or to the supporting means exclusively by mounting sealing weld seams so that it is not necessary to subject the tube sheet portions to heat treatment after the welding procedure.

As a set of in accordance with the invention prefabricated tube bundle reactor subassemblies thus can be assembled under conditions prevailing at the construction site, a tube bundle reactor is offered which meets the quality standards to be expected of a tube bundle reactor fully assembled at the works, as regards welding technique, process technology, and handling. The subassemblies of the tube bundle reactor also may be fabricated at different places and then shipped separately to the specific job site.

The essential steps taken for assembly at the construction site begin with, if any, welding and heat treating shell sections and shell subassemblies, respectively, and the lower head. Thereafter, the tube bundle subassemblies are introduced individually into the reactor shell and connected to each other and to the reactor shell. Finally, the upper head is connected to the reactor shell. It is no problem, here, to weld and heat treat the respective weld seams since the upper tube sheet has no direct contact with this assembly welding seam.

The steps of preparing and assembling a set of in accordance with the invention prefabricated tube bundle reactor subassemblies will be described in greater detail below.

The following subassemblies, for instance, may be prepared at the works for their final assembly, i.e. with the welding processes and heat treatment completed:
  a plurality of tube bundle subassemblies the reactor tubes of which are welded to the associated tube sheet portions, wherein the lower and/or upper tube sheet portions comprise sealing means for connection to the reactor shell;
  a lower reactor head, including nozzles, a support skirt connection facility, a cylindrical connector piece, tube sheet supporting means (e.g. ribs), a bearing ring for tube sheet portions or parts thereof, a supply duct for heat carrier;
  a plurality of subassemblies of the reactor shell sections, some equipped with sealing means to be connected to a tube sheet;
  upper reactor head, including nozzles;
  steam outlet with expansion joint;
  support skirt base member.

All the subassemblies prepared at the works and ready for assembly are shipped to the construction site where stepwise mounting will be carried out, for instance, as follows:
  The first shell section is welded to the lower reactor head in horizontal alignment.
  One after the other, the next shell sections are mounted in the same alignment and connected by welding.
  The support skirt base member is mounted and welded to the support skirt connection facility of the shell/head subassembly, finished but still lying.
  The shell/head subassembly, including the support skirt base member connected to it, is heat treated as a whole.
  The shell/head subassembly, including the support skirt base member is erected vertically on a foundation and fixed to it.
  The individual tube bundle subassemblies are introduced into the reactor shell and the lower reactor head and positioned on the supporting means.
  The individual tube bundle subassemblies are welded tightly to the reactor shell and to the heat carrier supply duct as well as amongst each other.
  The steam outlet, including the expansion joint is fitted into and welded to the upper tube sheet.
  The upper reactor head is welded to the uppermost shell section and to the steam outlet and then submitted to heat treatment.

The sequence of the individual mounting steps may be changed depending on local circumstances and specific requirements.

According to the invention, the object of providing transportable tube bundle reactors of great capacity is met also by a tube bundle reactor which, while offering the same capacity as known transportable reactors, is more compact in design. Or, in other words, its capacity is greater if it has the same dimensions as the known reactors mentioned. According to claim 21, that is achieved by the invention in that at least one pipe for supplying and/or discharging the heat carrier extends in axial direction through a tube sheet. Therefore, a feed and/or discharge duct extending in radial direction through the reactor shell is superfluous. Consequently the radial dimensions of the tube bundle reactor are reduced substantially.

If it is desired to increase the capacity of such a tube bundle reactor to an extent that would render it no longer transportable as a reactor in finally assembled state ex works, the design according to the invention permits the tube bundle reactor specifically to be divided into a set according to the invention which consists of prefabricated tube bundle reactor subassemblies. This is possible because the feed pipes or discharge pipes passing through the tube sheets may be designed to function simultaneously as vertical supporting means for tube bundle subassemblies. For details, reference is made to the description above of the vertical support of tube bundle subassemblies.

Once joined at the construction site, the tube bundle subassemblies form a common functional unit which is surrounded by a common heat carrier space. The liquid heat carrier entering the space inside the shell, preferably, is distributed uniformly and/or collected through passageways which are free of tubes and extend in especially preferred star-like fashion away from the feed pipe and/or discharge pipe of the heat carrier. Further measures may be taken to distribute the liquid heat carrier entering the space inside the shell, as known in the art.

Moreover, a discharge pipe for the liquid-steam mixture extending through the upper tube sheet, in the case of an at least partly evaporating heat carrier, may readily function as support for a steam drum disposed above the upper reactor head. In this manner, the building space requirement for the steam drum is reduced, as no means are required to provide support at the outside of the reactor shell.

In preferred embodiments, only one feed pipe and/or only one discharge pipe may be provided centrally, or two or more feed pipes and/or discharge pipes may be arranged in decentralized manner symmetrically with respect to the reactor axis. In any case, they may be devised as supporting means for the tube bundle subassemblies.

As far as the arrangement of the kind specified initially is concerned, the object of providing a transportable tube bundle reactor unit of great capacity is met, according to the invention, by the characterizing features of claim 30. As the gas inlet and gas outlet heads of adjacent tube bundle reactors each are interconnected by short piping, the tube bundle reactors do not each need an external gas supply line and gas discharge line of their own. That permits the tube bundle reactors to be positioned very close together. Moreover, a common steam drum is disposed above the upper reactor heads in such a way as to be in fluid communication with each tube bundle reactor, i.e. with the respective pressure vessel for the heat carrier. On the whole, the arrangement requires distinctly less building space laterally of the tube bundle reactors, i.e. in horizontal direction, than known arrangements as it benefits from the measures of the invention.

As regards dimensions and weights, each individual tube bundle reactor may be laid out so that it can leave the works and still be transportable as a fully assembled tube bundle reactor. At the construction site, individual tube bundle reactors will be united to form the arrangement according to the invention and thus present a composite reactor unit of great capacity.

With a preferred embodiment, the cross sectional size of the gas supply pipes and gas discharge pipes as well as of the short interconnecting pipes between the reactor heads is chosen to be the same as of a manhole. This guarantees accessibility of the reactor heads by persons to carry out maintenance or repair work. No separate access nozzle is needed at each reactor head.

Advantageously, the steam drum is connected to each tube bundle reactor by at least one riser and by downcomers. Also these risers serve as supports for the steam drum. The downcomers can convey the liquid heat carrier from the steam drum directly back to the tube bundle reactors.

As a favorable further development of the invention, all the tube bundle reactors are secured to one another to provide one mechanical unit, standing on a common base structure. In another preferred embodiment, all the tube bundle reactors are surrounded by a common insulating shell. These measures help to keep expenditures low for fastening and supporting measures as well as insulation means of the tube bundle reactors.

Preferably, all the tube bundle reactors in an arrangement according to the invention are tube bundle reactors of the kind specified above.

BRIEF DESCRIPTION OF THE SEVERAL VIEWS OF THE DRAWING(S)

The invention will be described in greater detail below with reference to the accompanying drawings, in which:

FIG. 5b is a cross sectional elevation of the supporting means shown in FIG. 5a, along line Vb-Vb in FIG. 5a;

FIG. 10b is a cross sectional elevation of the tube bundle reactor shown in FIG. 10a, along line Xb-Xb in FIG. 10a;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
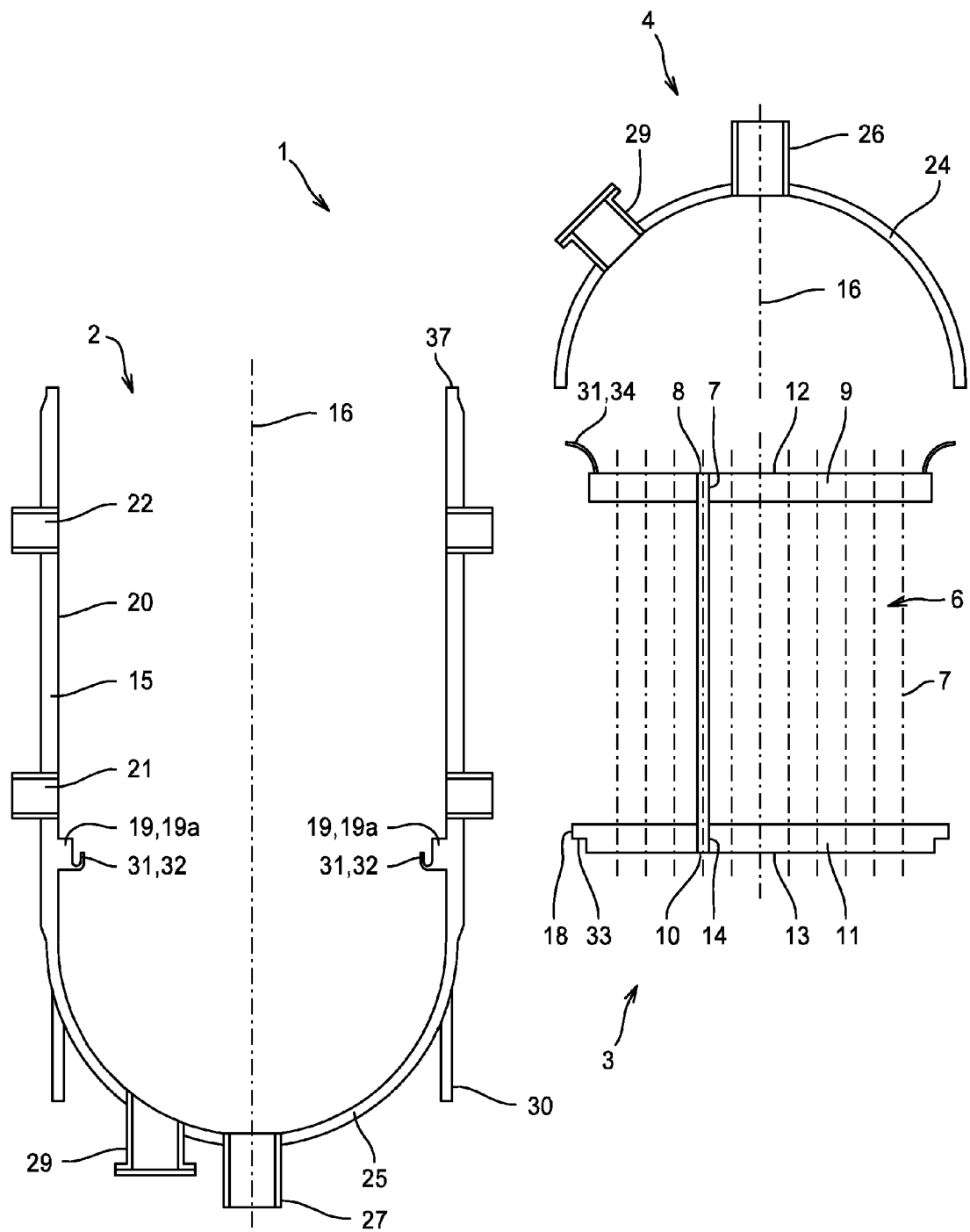
FIG. 1a is a diagrammatic illustration of an embodiment of a set of subassemblies according to the invention, comprising a shell/head subassembly, a tube bundle subassembly, and a head subassembly, each subassembly shown in longitudinal section.
Figure 1B:
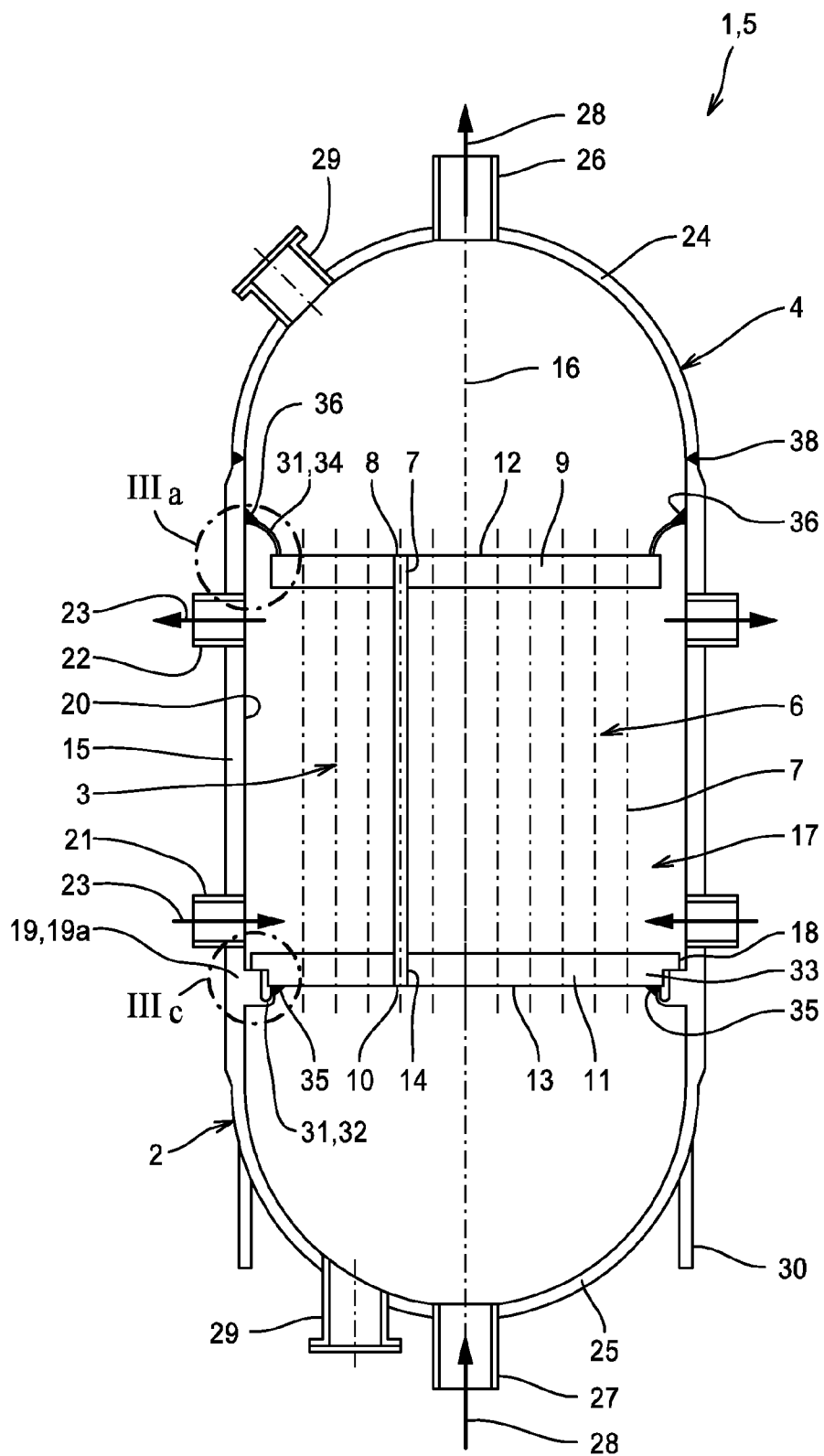
FIG. 1b shows the subassemblies of FIG. 1a combined to form a tube bundle reactor.

FIG. 1a shows an embodiment of a set 1 according to the invention of prefabricated tube bundle reactor subassemblies 2, 3, 4 which can be fitted together to form the tube bundle reactor shown in FIG. 1b.

The tube bundle reactor 5, as fully mounted, may be laid out for catalytic exothermal or endothermal gas and/or liquid reactions to be performed. It comprises a bundle 6 of vertical reactor tubes 7 filled with catalyst. The upper ends 8 of the reactor tubes 7 are fastened in an upper tube sheet 9 in pressure tight manner, i.e. also tight against gas and liquid. The lower ends of the reactor tubes 7 are tightly fastened in a lower tube sheet 11. The reactor tubes 7 extend through the respective tube sheets 9, 11 preferably as far as the surfaces or sides 12, 13 thereof remote from the reactor tubes 7. The ends 8, 10 of the reactor tubes 7 are open and welded at their faces or outer sides 14 to the tube sheets 9, 11.

As a rule, the outer diameters of the reactor tubes 7 lie in a range between 15 mm and 60 mm and the wall thicknesses between 1 mm and 3 mm. The preferred lengths of the reactor tubes 7 used with this invention lie in a range between 6 m and 15 m. The figs. do not show the lengths and diameters true to scale.

The tube bundle 6 is enclosed in a cylindrical reactor shell 15 which is pressure tightly connected to the tube sheets 9, 11. Reference numeral 16 designates the central axis. The reactor shell 15 and the tube sheets 9, 11 together thus form a pressure vessel 17. By its peripheral edge 18, the lower tube sheet 11 rests on a supporting means 19, embodied by a bearing ring 19a in FIGS. 1a and 1b, which is fastened to the inside wall 20 of the reactor shell 15. The upper tube sheet 9 is supported exclusively by the reactor tubes 7 and, therefore, axially movable.

The reactor shell 15 comprises radially extending inlet nozzles 21 and outlet nozzles 22 for a liquid heat carrier 23. The heat carrier 23 is fed under pressure into the pressure vessel 17 formed by the reactor shell 15 and the tube sheets 9, 11 and, while flowing around the reactor tubes 7, it may partly evaporate. The heat carrier 23 exits through the outlet nozzles 22.

Each tube sheet 9, 11 is spanned by a reactor head 24, 25 which is in fluid communication with the reactor tubes 7 through the open ends 8, 10 thereof. One of the reactor heads 24, 25, in the example shown the lower one 25, forms a gas inlet head, while the other reactor head 24 is the gas outlet head. The reactor heads 25, 24 of the embodiment shown comprise a central gas inlet nozzle 27 and a gas outlet nozzle 26 for a reaction gas 28. Moreover, they each comprise a decentrally located access nozzle 29 having the width of a manhole and designed to be opened and closed again.

The embodiment shown is one of three prefabricated subassemblies 2, 3, 4 adapted to be built together at the construction site, i.e. at the final place of erection of tube bundle reactor 5 and thus be the finished tube bundle reactor 5 ready for operation.

It is essential that it is assured when deciding on the division into subassemblies, that the reactor tubes 7 with the tube sheets 9, 11 fastened to them and perhaps further elements likewise secured to them, such as baffle plates, always will constitute subassemblies which are separate from the reactor shell 15 and the reactor heads 24, 25.

Among the subassemblies there is a shell/head subassembly 2. It includes the reactor shell 15 and the lower reactor head 25 fastened to the shell. Gas distribution means of a kind known in the art are received in the lower reactor head 25. The lower reactor head 25 also comes with the gas inlet nozzle 27 and the access nozzle 29 already fastened to it. Moreover, supporting means 30 are secured to the outside of the reactor head 25. They may become connected to a base structure for support of the entire tube bundle reactor 5.

The reactor shell 15 is provided with the inlet and outlet nozzles 21, 22 for the heat carrier 23. Furthermore, a continuous bearing ring 19a on which the lower tube sheet 11 may be placed is fixed to the inside wall 20 of the reactor shell 15 near the lower reactor head 25, and sealing means 31 secured to the bearing ring 19a may become pressure tightly connected to the lower tube sheet 11. These sealing means 31 embodied by a lip 32 which is flexible in radial direction will be described in greater detail below with reference to FIG. 3c.

The set of subassemblies further includes a tube bundle subassembly 3. It contains the tube bundle 6 with the two tube sheets 9, 11 secured to the bundle. At its lateral peripheral edge 18, the lower tube sheet 11 is formed with a shoulder 33 by which it may be placed on the bearing ring 19a of the shell/head subassembly 2. Arc-shaped sheets 34 are fastened pressure tightly to the upper side 12, remote from the tube bundle 6, of the upper tube sheet 9. By means of these sheets 34, the upper tube sheet 9 may be connected tightly to the inside wall 20 of the reactor shell 15.

The sealing means 31 are elastically deformable in radial direction so as to follow different radial thermal expansions of the tube sheets 9, 11 and the reactor shell 15.

The third subassembly of the set of subassemblies illustrated is a head subassembly 4 which includes the upper reactor head 24. The gas outlet nozzle 26 and also an access nozzle 29 already are attached to the lower reactor head 24.

The description below will deal with assembling the three subassemblies 2, 3, 4 to form a complete tube bundle reactor 5.

To begin with, the shell/head subassembly 2 is erected vertically, the lower reactor head 25 becoming the bottom end. Thereupon, the tube bundle subassembly 3 is introduced into the open upper end of the reactor shell 15, the lower tube sheet 11 leading as the lower end of the tube bundle subassembly 3. This manner of inserting the tube bundle subassembly 3 into the shell/head subassembly 2 is continued until the shoulder 33 of the lower tube sheet 11 abuts against the bearing ring 19a in the shell/head subassembly. Thereupon, assembly welding seams 35 are applied to pressure tightly weld the lower sealing means 32 to the bottom side 13 remote from the tube bundle 6 of the lower tube sheet 11. Also, assembly welding seams 36 are applied to pressure tightly weld the sealing means 34 which are fastened to the upper sheet 9 to the inside wall 20 of the reactor shell 15. Finally, the head subassembly 4 is placed on the upper edge 37 of the reactor shell 15 and connected to the same by an assembly welding seam 38 as well.

The bearing ring 19a accommodates the full vertical load exclusively via contact between the lower tube sheet 11 and the bearing ring 19a. No further fastening means or measures are needed to carry off load, in particular no welding throughout the full thickness of the tube sheet which would make it necessary to subject the same to heat treatment following the welding. As the assembly welding seams 35, 36 described above are nothing but sealing seams to create a pressure vessel 17 between the tube sheets 9, 11 and the reactor shell 15, they can be made relatively thin and consequently need not be subjected to subsequent heat treatment in accordance with the relevant regulations. The assembly welding seam 38 between the head subassembly 4 and the shell/head subassembly 2 readily may be heat treated, if need be, because there is no direct contact between the upper tube sheet 9 and this assembly welding seam 38.

FIGS. 2a to 2d illustrate further embodiments of supporting means 19 for vertical support of the tube bundle subassembly 3 by the shell/head subassembly 2, i.e. along the peripheral edge 18 of the lower tube sheet 11 or the upper tube sheet 9. All the associated pressure tight connections between the respective tube sheets 9, 11 and the reactor shell 15 shown in FIGS. 2a to 2d are produced exclusively by welding seams and are, therefore, not elastic.

Figure 2A:
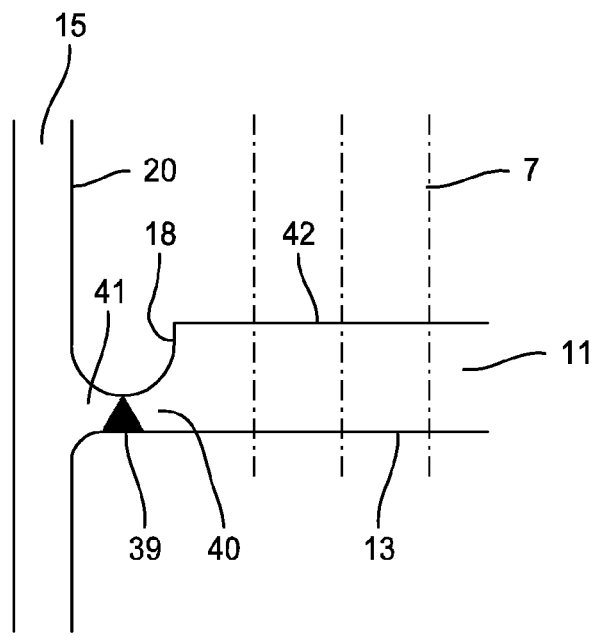
FIGS. 2a-2d are longitudinal sectional elevations of four embodiments of means for supporting the peripheral edge of a tube sheet, comprising a rigid, tight connection between the tube sheet and the reactor shell.

FIG. 2a shows an assembly welding seam 39 which transmits vertical forces between the lower tube sheet 11 and the reactor shell 15. To achieve that, a radially extending flange 40 is formed at the peripheral edge 18 of the tube sheet 11 and its thickness is reduced to such an extent, as compared to the thickness of the tube sheet 11, that heat treatment of the tube sheet 11 after welding is not required under the relevant regulations, e.g. AD specifications. At the inside wall 20 of the reactor shell 15, opposite the tube bottom flange 40, another flange 41 is formed which has a thickness corresponding to that of the tube bottom flange 40. The opposed edges of the flanges 40, 41 define a downwardly open joint so that a V-shaped assembly welding seam 39 can be produced from the bottom. This force transmitting welding seam 39, at the same time, establishes the tight connection 31 between the tube sheet 11 and the reactor shell 15. The flanges 40, 41 may be made flush with the bottom side 13 of the tube sheet 11, or they may be formed at the upper side 42 of the tube sheet 11 facing the tube bundle 6. The upper tube sheet 9 likewise may be connected to the reactor shell 15 by welding, making use of such flanges 40, 41. Also, both tube sheets 9, 11 of a tube bundle may be welded to the reactor shell 15.

Figure 2B:
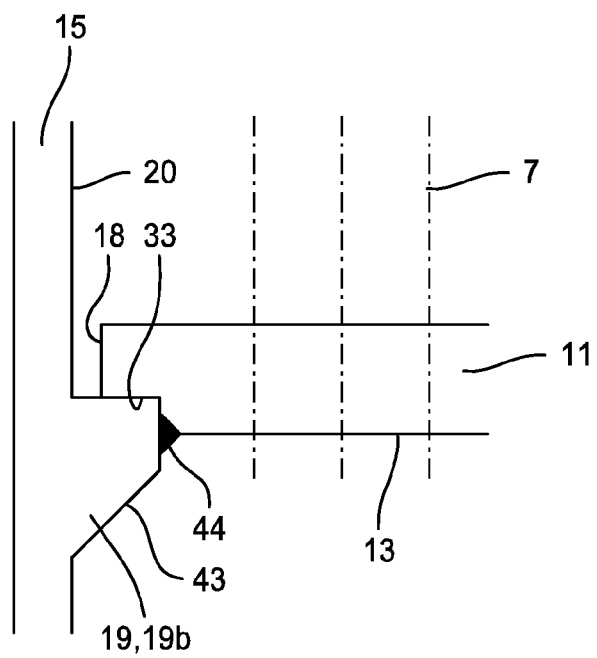

In the embodiment illustrated in FIG. 2b, a bearing ring 19b formed with a downwardly inclined lower side 43 serves to receive a lower tube sheet 11. The pressure tight connection 31 between the tube sheet 11 and the reactor shell 15 and the bearing ring 19a, respectively, is established by an assembly sealing weld seam 44 at the bottom side 13 of the tube sheet 11.

Figure 2C:
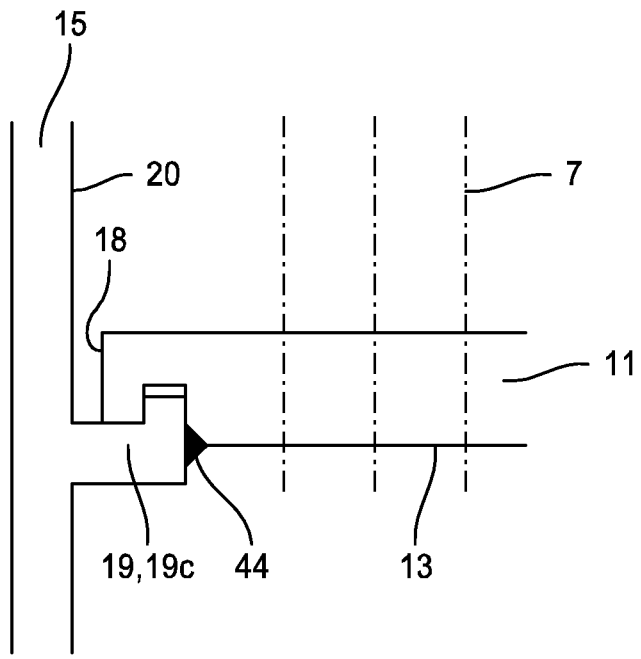

FIG. 2c illustrates an embodiment with which the bearing ring 19a and the peripheral edge 18 of the lower tube sheet 11 are mutually engaged in the manner of claws and hooks, respectively, whereby they provide a connection in form lock not only in vertical direction but also radially. The pressure tight connection 31, 44 is obtained in the same way as in the case of FIG. 2b.

Figure 2D:
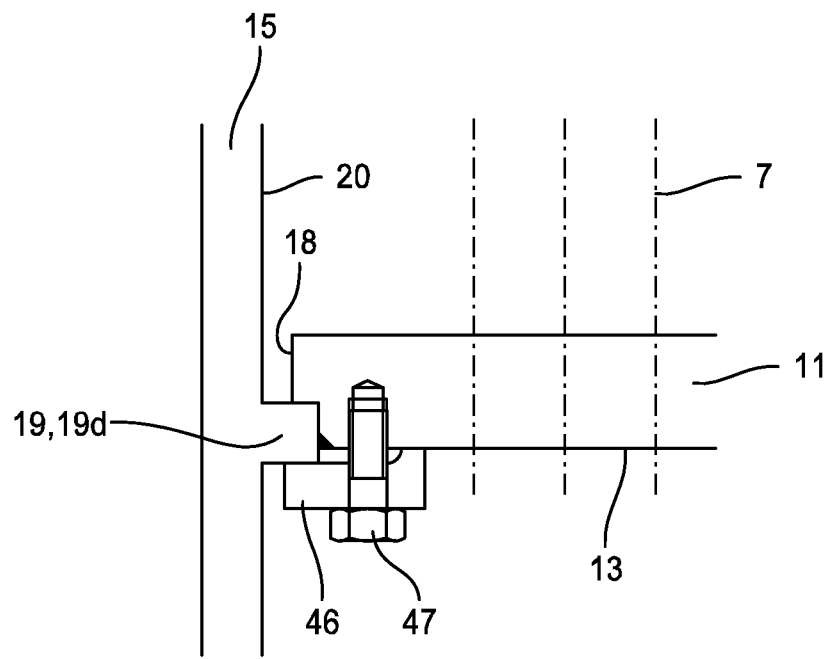

In respect of vertical support, the embodiment according to FIG. 2d corresponds essentially to the embodiment explained with reference to FIG. 1a, but the spacing between the bottom side 13 of the lower tube sheet 11 and the bottom side 45 of the bearing ring 19a is smaller. An additional bar 46 is provided here to accommodate upwardly directed forces. It abuts against the bottom side 45 of the bearing ring 19a as well as the bottom side 13 of the lower tube sheet 11, and a screw 47 is passed through and threaded into the bottom side 13 of the tube sheet 11 to tighten the bar 46 against both the bearing ring 19a and the tube sheet 11.

FIGS. 3a to 3d illustrate further embodiments of sealing means which are deformable elastically in radial direction between the tube sheet and the reactor shell and reactor head, respectively.

Figure 3A:
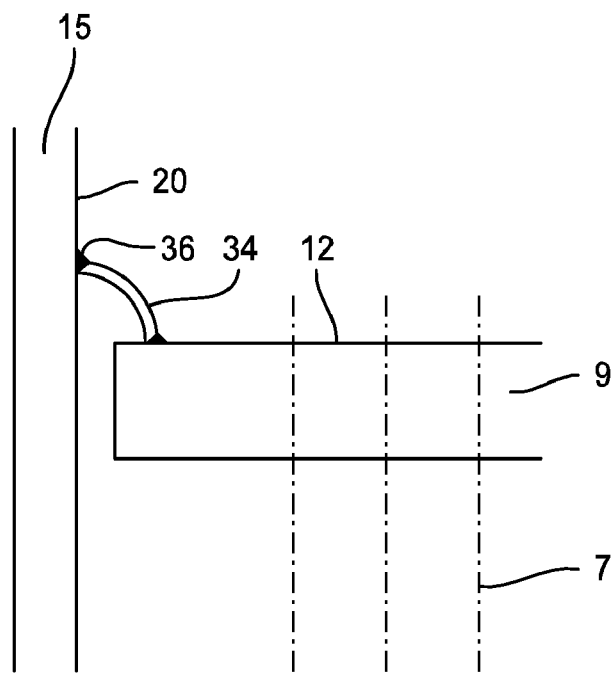
FIGS. 3a-3d are longitudinal sectional elevations of four embodiments of elastically deformable sealing means.

FIG. 3a is an enlarged view of the sealing means 34 shown in FIGS. 1a and 1b between the upper tube sheet 9 and the reactor shell 15, designated detail IIIa in FIG. 1b. The sealing means 34 is embodied by an arc-shaped sheet welded at the works to the upper side 12 of the tube sheet 9. At the construction site, upon assembly of subassemblies 2, 3, 4, it is connected to the reactor shell 15 by the assembly welding seam 36.

Figure 3B:
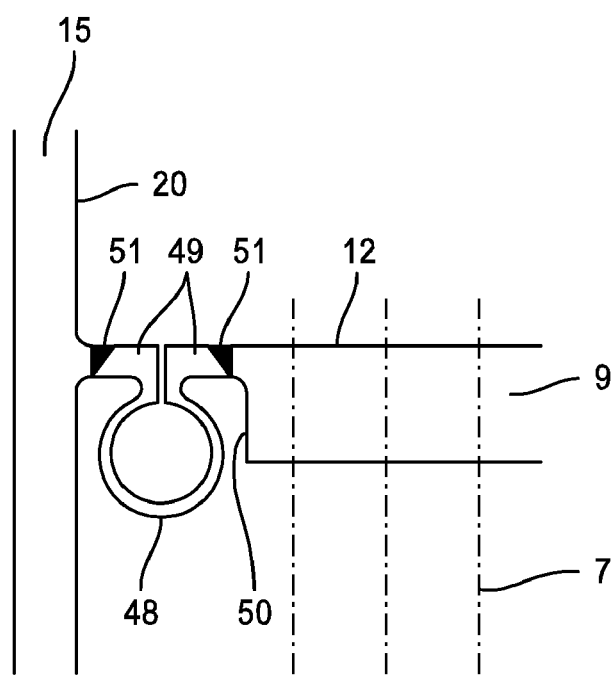

FIG. 3b shows sealing means 48 having an annular cross section and being connected by a fastening flange 49 each to the peripheral edge 50 of the upper tube sheet 9 and to the reactor shell 15. Both welding seams 51 in this embodiment may be made as assembly welding seams.

Figure 3C:
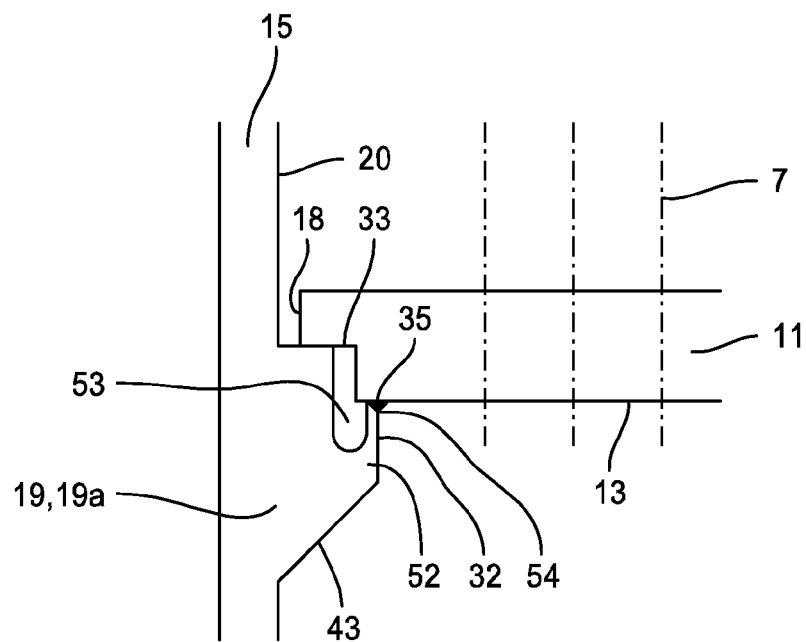

FIG. 3c shows the detail designated IIIc in FIG. 1b, on an enlarged scale. The supporting means 19 is embodied by a bearing ring 19a having an inclined lower side 43 (similar to FIG. 2b). By a shoulder 33 formed at its peripheral edge 18, the lower tube sheet 11 rests on this bearing ring 19a. In the embodiment according to FIG. 3c, a vertical lip 32 is formed radially inwardly of the bearing ring 19a, a flexurally stiff connection existing between the lower end 52 of this lip 32 and the bearing ring 19a. The lip 32 has a given length and is disposed at a predetermined radial spacing 53 from the bearing ring 19a. In the assembled state of the tube bundle subassembly 3 and the shell/head subassembly 2, the lip 32 may be connected at its upper end 54 by an assembly welding seam 35 to the bottom side 13 of the lower tube sheet 11. The lip 32 is bendable in radial direction by virtue of its free length.

Figure 3D:
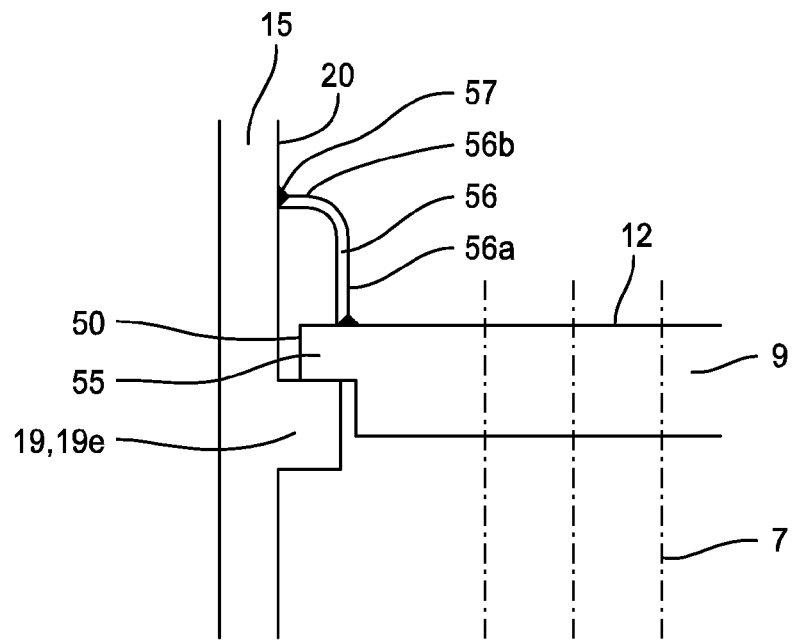

The embodiment shown in FIG. 3d of a sealing means 31 substantially corresponds to the embodiment according to FIG. 3a. Here, however, the upper tube sheet 9 rests on the bearing ring 19a by a shoulder 55 formed at its peripheral edge 50, and the sealing means 31 is embodied by an L-shaped sheet. The long leg 56a is welded to the upper side 12 of the tube sheet 9 at the works and extends in vertical direction. The connection between the short leg 56b and the reactor shell 15 is produced by an assembly welding seam 57 after the subassemblies 2, 3, and 4 have been joined.

The embodiments of sealing means 31 as shown in FIGS. 3a, 3b, and 3d may be used also with lower tube sheets 11, in mirror-inverted orientation about a horizontal axis.

Instead of the three subassemblies 2, 3, 4 discussed above, a subassembly set 1 according to the invention also may comprise a greater number of subassemblies. For instance, instead of just one subassembly, several subassemblies each may be made comprising a reactor shell 15 and a reactor head 24, 25, or a tube bundle 6 with the tube sheets 9, 11 attached to them, or the second reactor head 25, 24.

Figure 4:
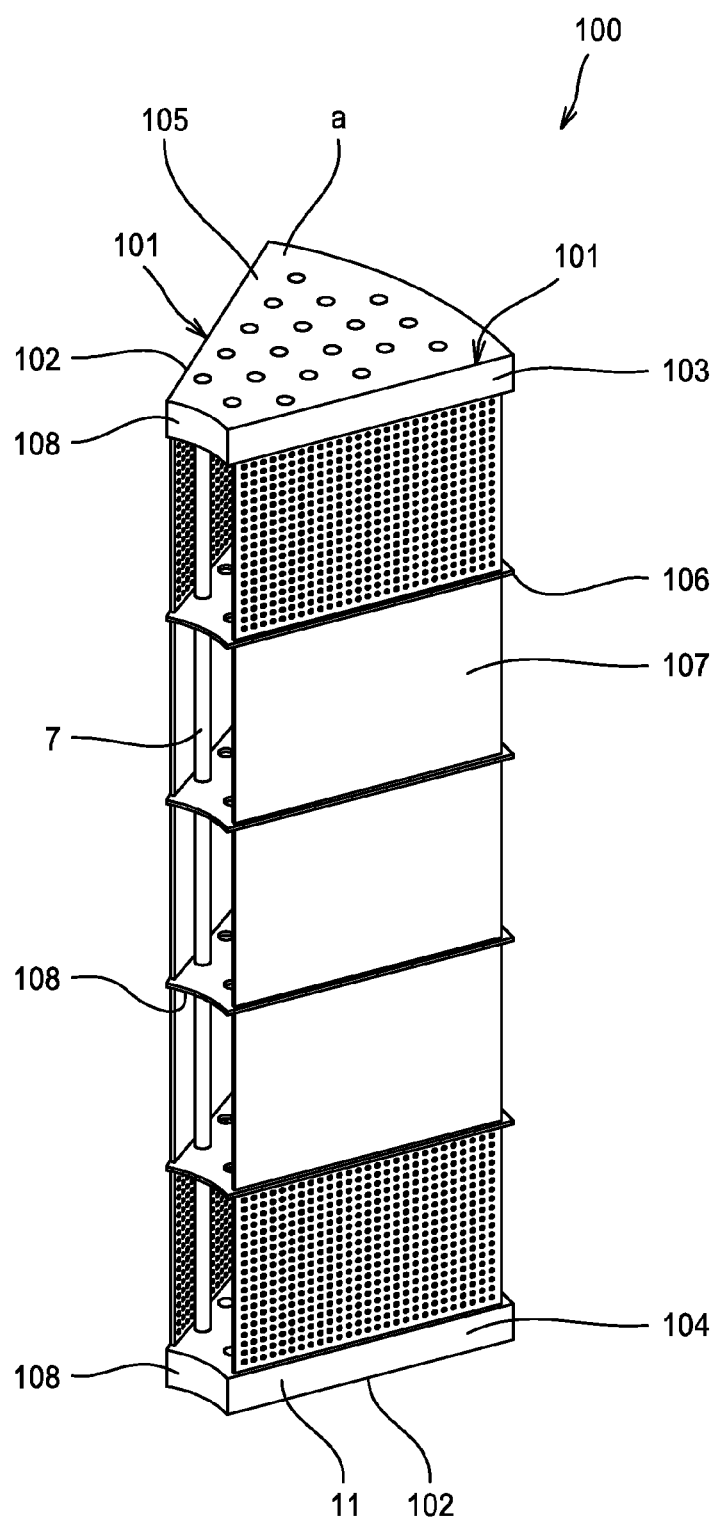
FIG. 4 is a perspective view of a sector-shaped tube bundle subassembly.

FIG. 4 illustrates a tube bundle subassembly 100 which results from dividing a tube bundle 6 with associated tube sheets 9, 11 into a plurality of subassemblies. The tube bundle 6 is divided along planes of division 101 which extend parallel to the reactor tubes 7. In the embodiment shown, the planes of division 101 extend in radial direction and they each contain the central axis 16 of the tube bundle 6. This results in tube bundle subassemblies 100 having the shape of sectors.

The radially extending edges 102 of the tube sheets 9, 11 define the edges of division of the tube bundle subassembly and the tube bundle sector 100, respectively. In the embodiment shown, they include an angle of 45° so that a tube bundle 6 may be composed of eight such tube bundle sectors 100.

The reactor tubes 7 of such tube bundle subassemblies 100 located at the outside in circumferential direction are positioned at a predetermined distance in circumferential direction from adjacent edges of division 102 of the tube sheet sectors 103, 104. In this manner, passageways 105 free of tubes are formed along the edges of division 102 of the tube sheet sectors 103, 104 when the tube bundle sectors 100 are assembled, whereby free space is offered for pressure tightly connecting the tube bundle sectors 100 to each other.

In the embodiment shown, four baffle plates 106 likewise sector-shaped, extend transversely of the reactor tubes 7 in each tube bundle sector 100 between the tube sheet portions and the tube sheet sectors 103, 104, respectively. The reactor tubes 7 extend through and are connected to the baffle plates 106. The baffle plates 106 prevent buckling of the reactor tubes 7.

In the interest of clarity, FIG. 4 represents only one reactor tube 7; openings for passage of the heat carrier 23 are not shown in the baffle plates 106.

In each tube bundle sector 100 adjacent baffle plates 106 are connected to each other as well as the tube sheets 103, 104 and the respective adjacent baffle plates 106 are connected to each other by vertical sheets 107 offering a connection which is shear resistant and flexurally stiff particularly in the plane of the sheets. The sheets 107 between the tube sheets 103, 104 and the respective adjacent baffle plates 106 are perforated to permit the heat carrier to pass. The vertical sheets 107, in the embodiment shown, are positioned between the outer reactor tubes 7 in circumferential direction and the radial edges 102 of the tube sheet sectors and baffle plate sectors 103, 104, 106, respectively. These sheets 107 also are designed to prevent loss of stability, such as by buckling or warping, and they assure that the position of the baffle plates 106 is maintained so that, in turn, they can prevent bending or buckling of the reactor tubes 7 due to their being connected to them.

The sector-shaped tube sheets 103, 104 and the baffle plates 106 have a concave edge 108 of circular arc shape radially inwardly. This circular arc-shaped inner edge 108 of the tube sheet sectors 103, 104 is intended to abut against and be fixed to a central support or a central nozzle.

FIG. 4 does not show by what means the tube sheet sectors 103, 104 might rest on supporting means (e.g. a shoulder at the peripheral edge, as in the case of the tube bundle subassembly according to FIG. 1a), nor are any sealing means indicated. FIG. 4 simply is intended to present a diagrammatic embodiment of a tube bundle subassembly 100 having sector shape.

Figure 5A:
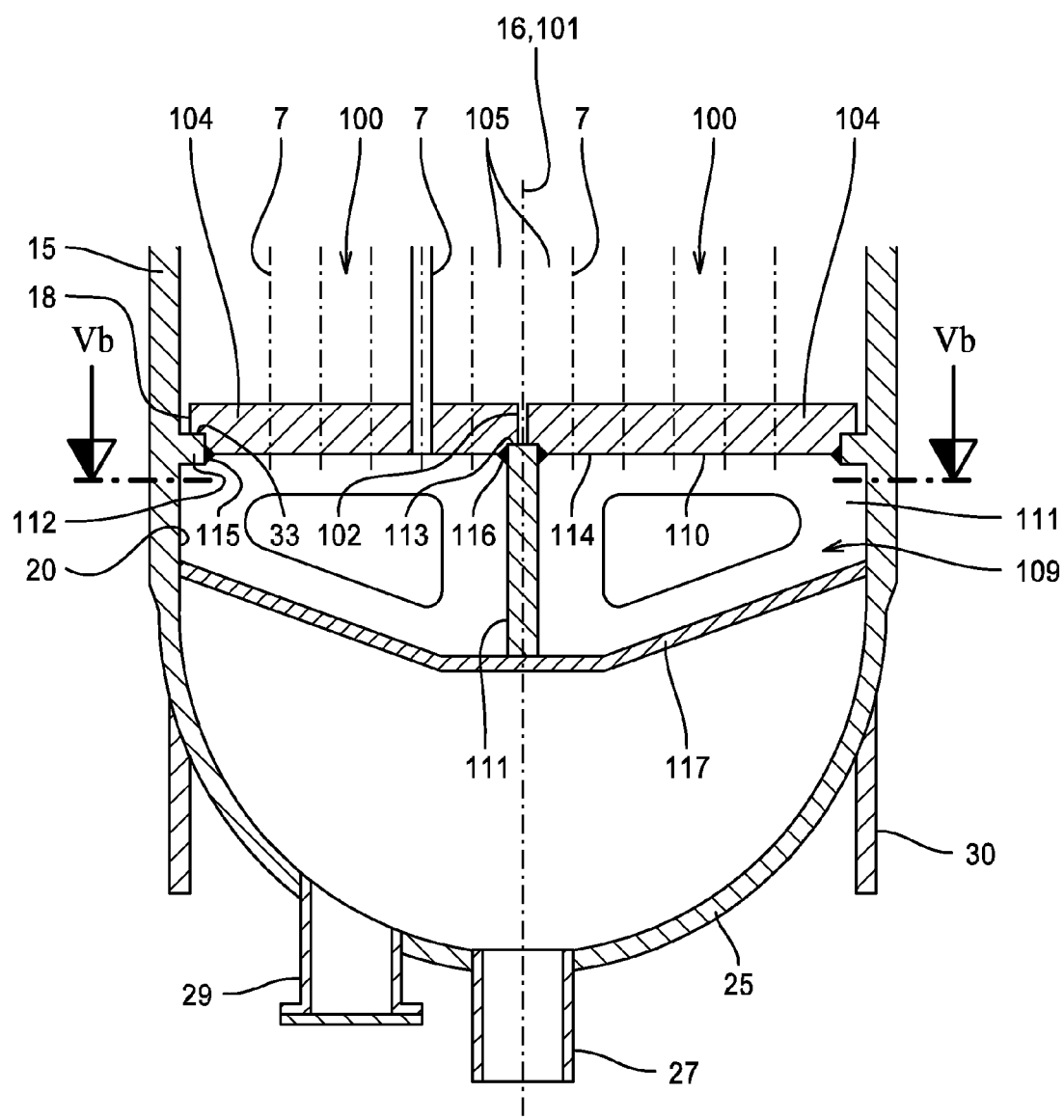
FIG. 5a is a longitudinal sectional elevation of an embodiment of supporting means in the form of ribs, as seen in the direction of line Va-Va in FIG. 5b.
Figure 5B:
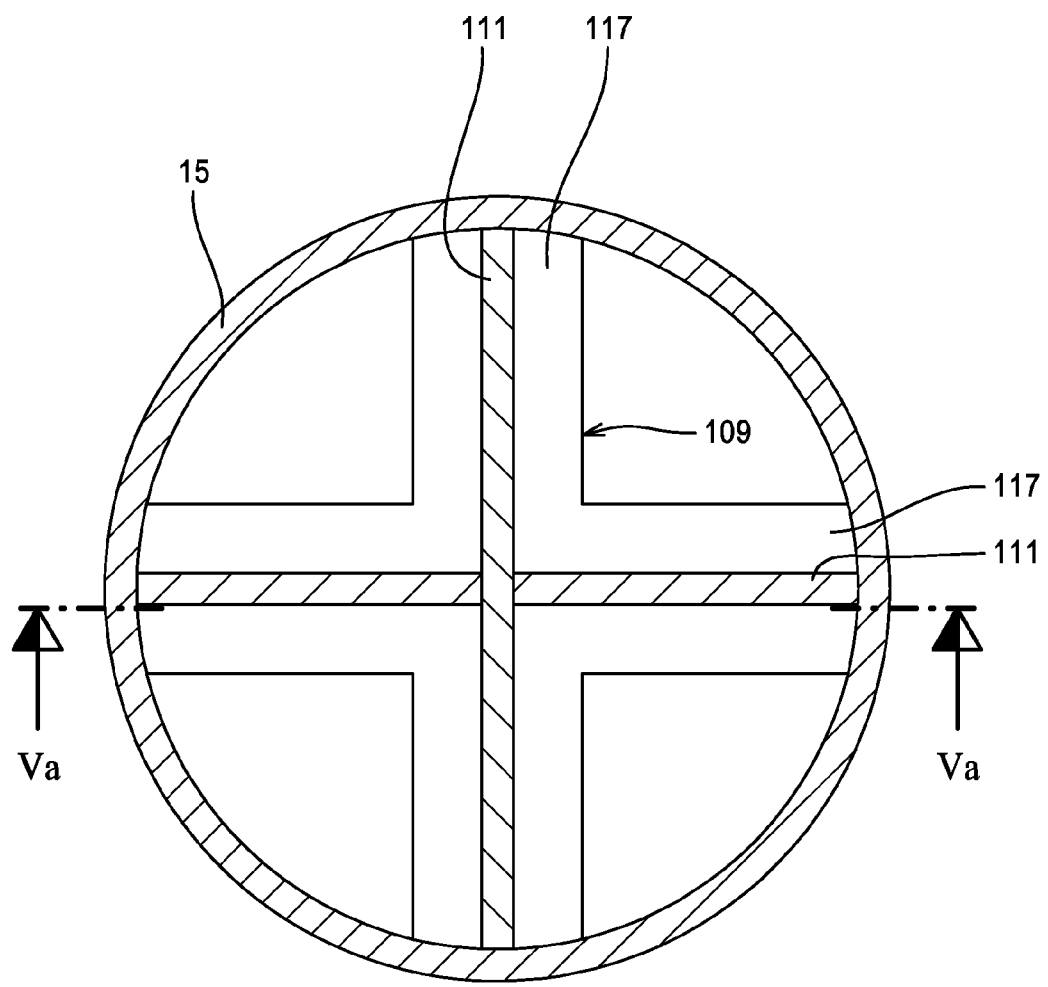

FIGS. 5a and 5b show an embodiment of a supporting means 109 of rib shape. As may be seen, ribs are arranged in the shape of a rectangular cross on which four tube bundle subassemblies 100 of sector shape are supported by their lower sector-shaped tube sheets and tube sheet portions 104, respectively. The sector angle in this case is 90°. The cross-section of the ribs 109 is that of an inverted T, the free edge 110 of the web 111 presenting the bearing surface for the lower tube sheets 104 of the tube bundle subassembly 100. The rib cross is welded to the inside wall 20 of the reactor shell 15.

Furthermore, a continuous bearing ring 112 is formed at the inside wall 20 of the reactor shell 15 to help carry the lower tube sheets 104 which are formed with shoulders 113, 33 along their edges of division 102 and peripheral edges 18. By these shoulders they rest on the ribs 109 and the bearing ring 112. At their bottom sides 114, the lower tube sheets 104 are welded to the bearing ring 112 and the ribs 109 by means of assembly sealing weld seams 115, 116. In the present case, the latter establish the pressure tight connections amongst the tube bundle subassemblies 100 as well as with the reactor shell 15.

The tube bundle subassemblies 100 include no other parts which might pierce the planes of division 101, i.e. protrude into the building space of an adjacent tube bundle subassembly 100. Thus the individual tube bundle subassemblies 100 and sectors, respectively, may be introduced one after the other from above and positioned on the cross of ribs 109 inside the reactor shell 15 which has been mounted before.

In FIG. 5a tubeless passageways 105 also can be seen which are arranged to extend like a cross in correspondence with the cross of ribs 109. The spacing of the outer reactor tubes 7 in circumferential direction from the edge of division 102 of the tube sheet sectors 104 has been selected so that the reactor tubes 7 will pass by the webs 111 when the tube bundle subassemblies 100 rest on the cross of ribs 109.

FIG. 5b shows the cross-like configuration of the webs 111 and flanges 117 of the cross of ribs 109.

FIGS. 6a to 6d illustrate some embodiments of connections between tube bundle subassemblies 100 amongst each other and/or with a supporting means 109 consisting of ribs.

Figure 6A:
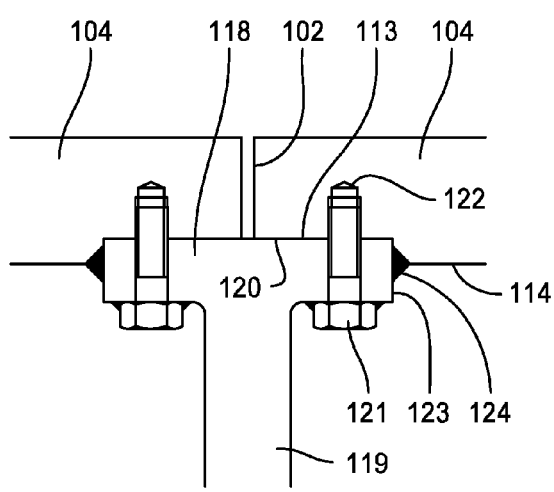
FIGS. 6a-6d are longitudinal sectional elevations of four embodiments of supporting means along edges of division in tube bundle reactor subassemblies, comprising tight connections between the tube bundle subassemblies.

In FIG. 6a, lower tube sheet sectors 104 are placed on the upper flange 118 of a T-shaped bearing rib 119. The edge of division 102 of the tube sheet sectors 104 is formed with a shoulder 113 to rest on the upper side 120 of the flange 118. Each shoulder 113 is attached to the flange 118 by a screw 121 which passes through the flange 118 from the bottom to the top, being screwed into a blind bore 122 in the shoulder 113 of the tube sheet sector 104. Moreover, the bottom side 114 of the tube bundle sector 104 is welded to the side edge 123 of the flange 118 by an assembly welding seam 124.

Figure 6B:
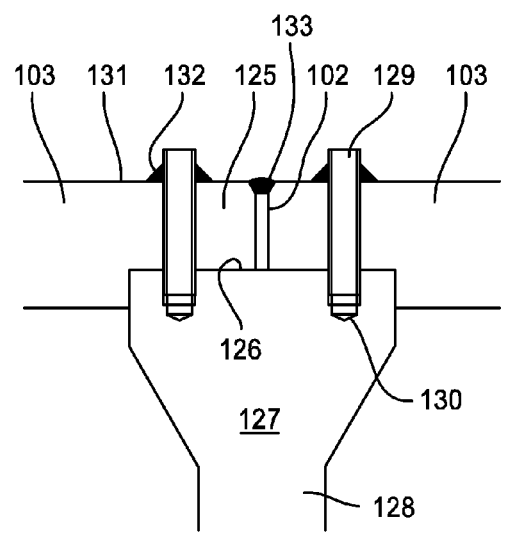

FIG. 6b shows a similar supporting means for use with the upper tube sheet sectors 103. The tube sheet sectors 103 rest with their shoulders 125 on the upper side 126 of an enlarged head 127 of a rib 128. A screw bolt 129 passing through the shoulder 125 from the top to be threaded into a blind bore 130 formed in the head 127 of the rib is welded tightly to the upper side 131 of the tube bundle sector 103 by means of an assembly welding seam 132. The edges of division 102 of the tube sheet sectors 103 are pressure tightly welded together by an assembly welding seam 133.

Figure 6C:
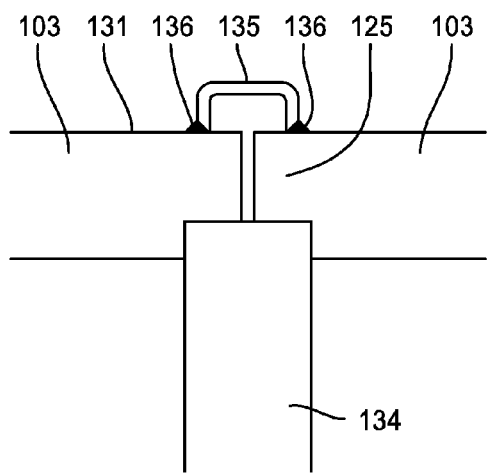

Also with the embodiment shown in FIG. 6c the upper tube sheets 103 of the tube bundle subassemblies 100 rest by a shoulder 125 on a rib 134 and are pressure tightly connected to each other by a U-shaped structural element 135 which bridges the joint between the tube sheet sectors 103 and is pressure tightly connected to the upper side 131 thereof by an assembly welding seam 136.

Figure 6D:
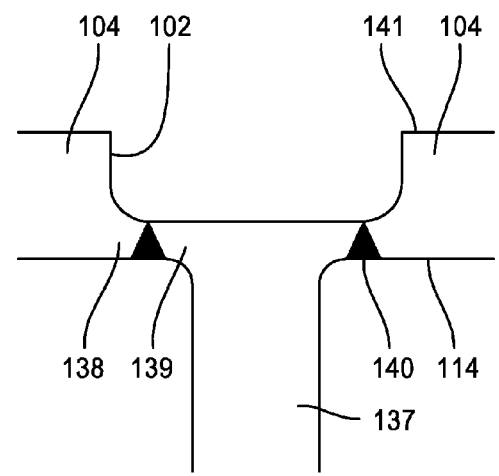

The embodiment shown in FIG. 6d has a connection between the lower tube sheet sectors 104 and a supporting rib 137, similar to that shown in FIG. 2a between the peripheral edge 18 of the lower tube sheet 11 and the inside wall 20 of the reactor shell 15. The edges of division 102 of the tube sheet sectors 104 include a flange 138 the thickness of which is less than the thickness of the tube sheet. The rib 137 is formed with flanges 139 having the same thickness as the tube sheet flanges 138 opposite to which they come to lie in the combined state of the subassemblies so that they may be connected to them by assembly welding seams 140. The assembly welding seams 140 in this structure provide both vertical support and a pressure tight connection. The thickness of the flanges 138, 139 and of the assembly welding seams 140, respectively, is chosen such that the structural members, when welded together, need not undergo heat treatment according to the relevant regulations.

The embodiment illustrated here shows the weld connection between lower tube sheet sectors 104 and a rib 137 as having flanges 138, 139 flush with the bottom side 114 of the tube sheet sectors 104. Yet the flanges 138, 139 also could be flush with the upper side 141 of the lower tube sheet sectors 104 and, moreover, they could also lie somewhere between these two limit positions. In all these cases the welding seams will be produced from below.

A similar weld connection is conceivable also for the force transmitting pressure tight connection between upper tube sheet sectors 103 and a rib. Again the flanges would be flush with the bottom or upper sides of the tube sheet sectors 103, or they would be positioned anywhere in between. The weld joints are open upwardly so that the assembly welding seams will be produced from the top.

Figure 7:
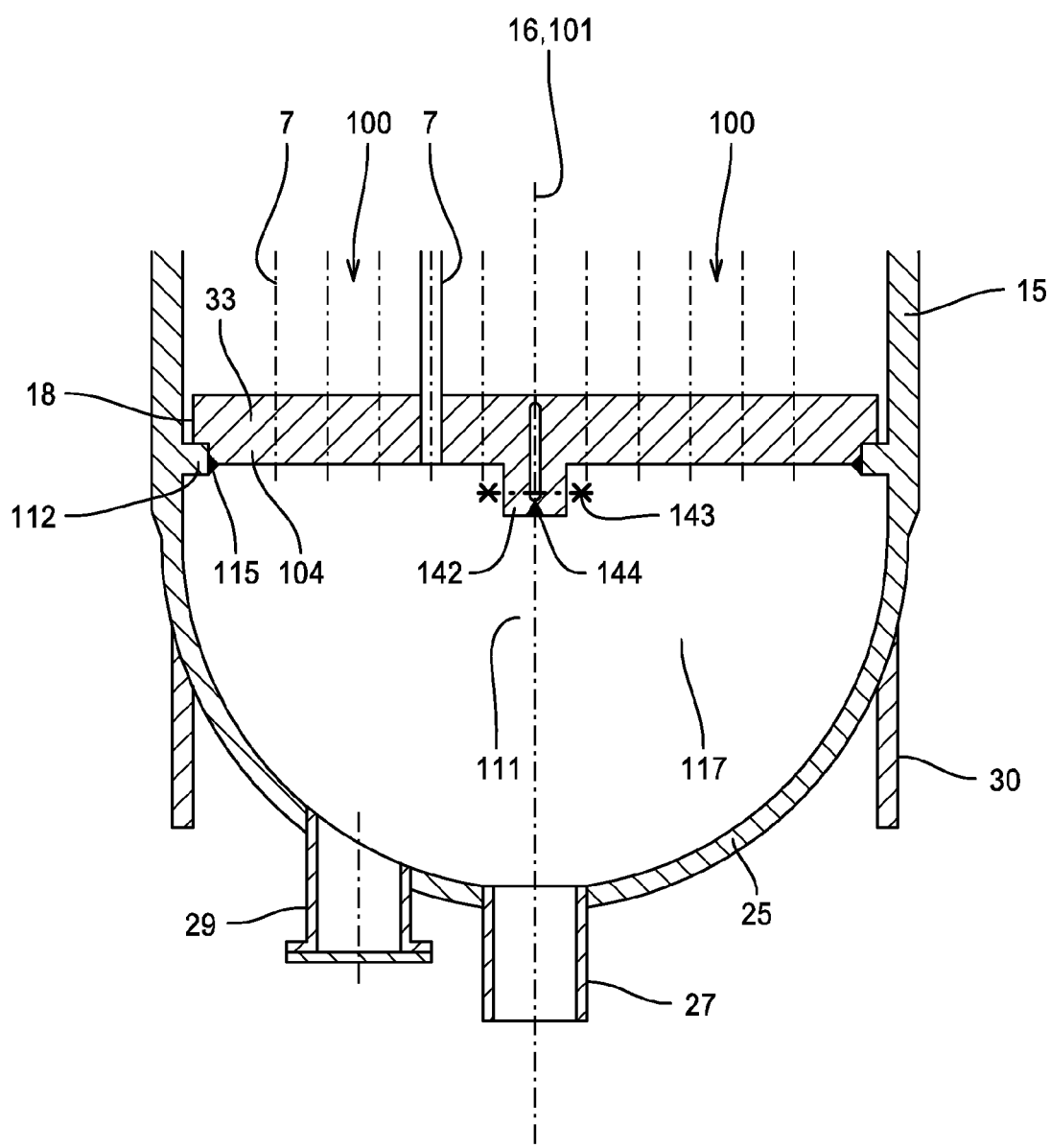
FIG. 7 is a longitudinal sectional elevation of an embodiment of a rigid connection providing stiffness against forces and moments between edges of division of tube bundle subassemblies.

FIG. 7 shows an embodiment of a connection without ribs between tube sheet sectors 104. Here, the edges of division 102 have connecting flanges 142 adapted to be screwed 143 together upon assembly of the subassemblies 100 so as to offer a rigid connection providing stiffness against forces and moments. The engagement between the connecting flanges 142 may cover the full surface area or only part thereof. In the example according to FIG. 7, the lower tube sheet sectors 104 are thus interconnected. The connecting flanges 142 are prepared at their ends remote from the reactor tubes 7 for welding seams so that, once combined, they may be connected pressure tightly to each other by an assembly welding seam.

At their peripheral edges 18, the tube sheet sectors 104 have shoulders 33 resting on a bearing ring 112 to which they are connected by an assembly welding seam 115, in a manner similar to the embodiment shown in FIG. 5*a*.

Figure 8:
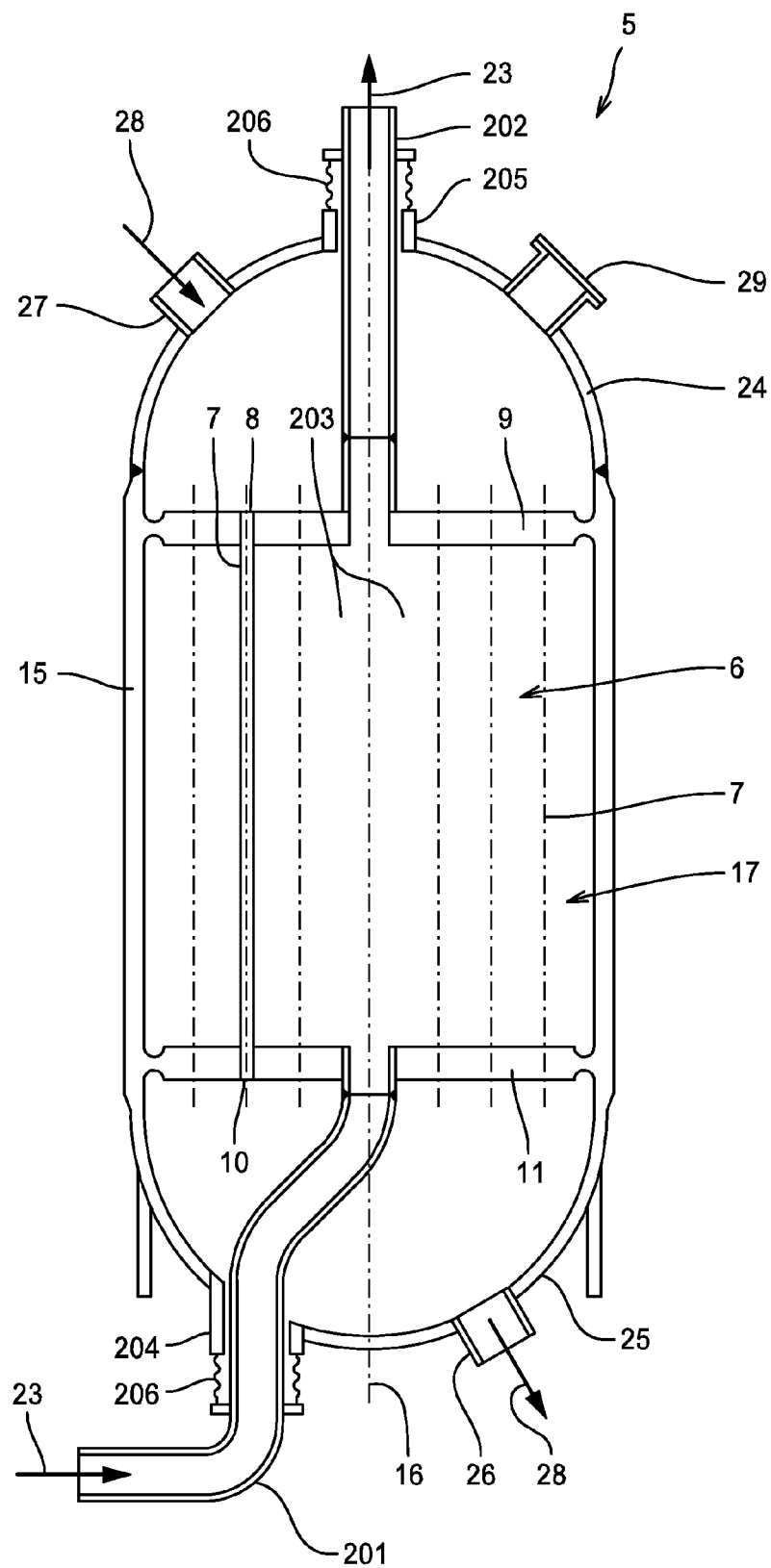
FIG. 8 is a longitudinal sectional elevation of a first embodiment of a tube bundle reactor according to the invention, comprising central axial inlet and outlet lines for the heat carrier.

FIG. 8 is an illustration of a tube bundle reactor 5 for carrying out gas and/or liquid phase reactions. The aim of this design is to reduce the horizontal dimensions of the reactor, i.e. the dimensions perpendicular to the reactor axis 16. To that end, the feed pipe 201 for liquid heat carrier 23 extends through a tube sheet, in this case the lower tube sheet 11. The discharge pipe 202 for the heat carrier 23 which may be a liquid-steam mixture as it leaves the reactor also extends through a tube sheet, in this case the upper tube sheet 9.

Like the reactor shown in FIG. 1*b*, this tube bundle reactor 5 comprises a bundle 6 of vertical reactor tubes 7 filled with catalyst material and having their ends 8, 10 fixed pressure tightly in the upper and lower tube sheets 9, 11. The tube bundle 6 is enclosed by a reactor shell 15 which is connected pressure tightly to the tube sheets 9, 11 so that a pressure vessel 17 is formed by the tube sheets 9, 11 together with the reactor shell 15 The connections, moreover, provide stiffness against forces and moments. The liquid heat carrier 23 supplied through the feed pipe 201 circulates under pressure around the reactor tubes 7 while, at the same time, it may also evaporate at least in part. A resulting liquid-steam mixture is passed out through the discharge pipe 202 into a steam drum (see FIG. 11). The tube sheets 9, 11 each are spanned by a reactor head 24, 25 connected to the reactor shell 15 and in fluid communication with the upper ends 8, 10 of the reactor tubes 7.

The tube bundle 6 has a central area 203 which is free of tubes and into which the feed pipe 201 and the discharge pipe 202 open. Tubeless passageways also extend in star-like fashion from the feed pipe 201 and discharge pipe 202 in order to distribute heat carrier 23 uniformly throughout the tube bundle 6.

The feed pipe 201 extends through an inlet nozzle 204 in the lower reactor head 25 and the discharge pipe 202 through an outlet nozzle 205 in the upper reactor head 24. Outside of the reactor 5, the nozzles 204, 205 each are connected via compensating means 206 to the pipes 201, 202. Varying thermal expansions of the pipes 201, 202 and heads 25, 24 thus can be compensated.

The upper reactor head 24, moreover, comprises a gas inlet nozzle 27, while the upper reactor head 25 comprises a gas outlet nozzle 26. Known gas distribution means are provided in the upper reactor head 24.

Figure 9:
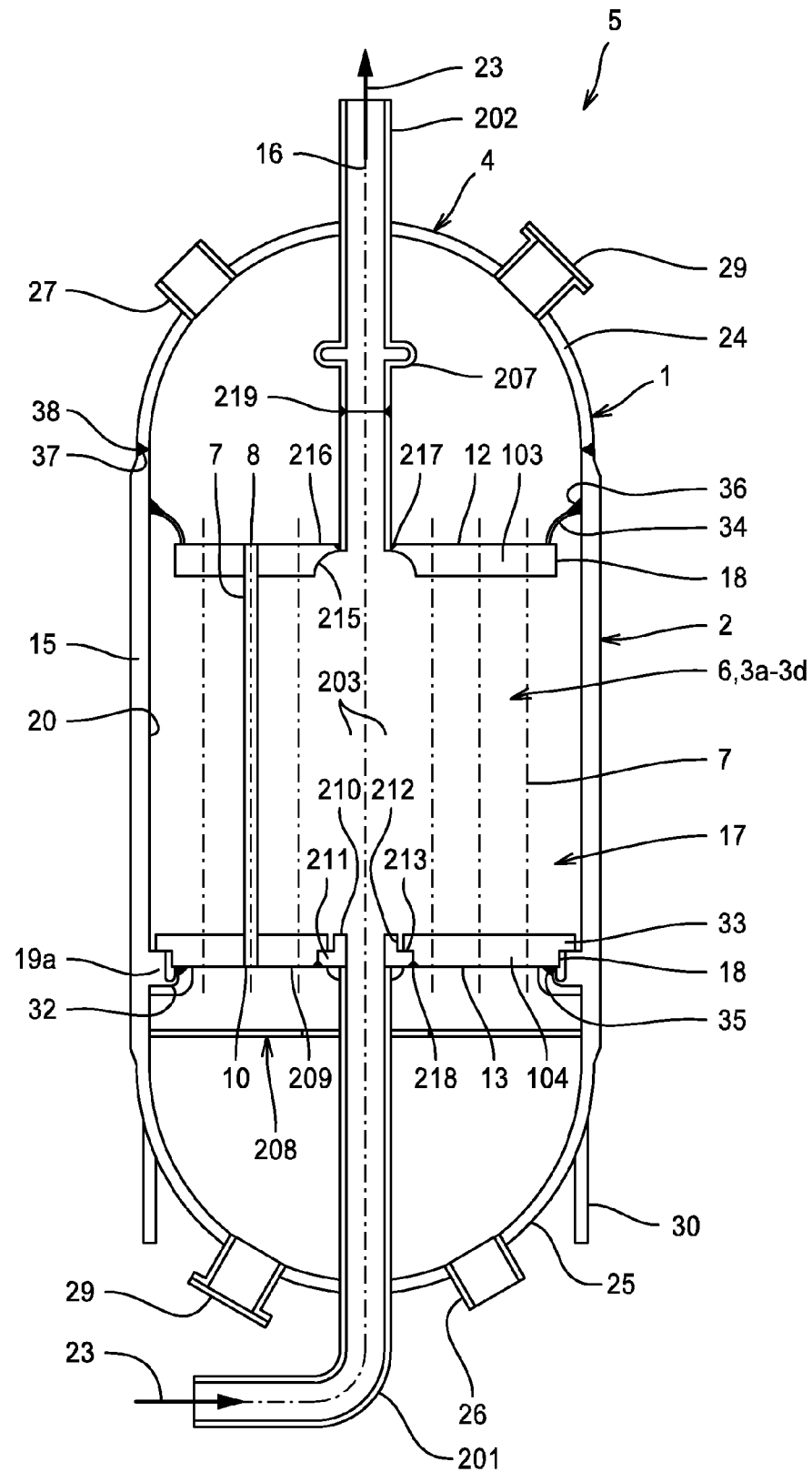
FIG. 9 is a longitudinal sectional elevation of a second embodiment of a tube bundle reactor according to the invention, comprising central axial inlet and outlet lines for the heat carrier.

FIG. 9 shows a modification of the embodiment according to FIG. 8. The reactor 5 illustrated in FIG. 9 is composed of a set of subassemblies 1 according to the invention.

Other than with FIG. 8, the upper tube sheet 9, 103 in the reactor 5 according to FIG. 9 is not connected rigidly to the reactor shell 15 but instead supported so as to be axially movable on the upper ends 8 of the reactor tubes 7. This means that the upper tube sheet 9, 103 is movable with respect to the reactor shell 15 and, therefore, able to follow thermal expansions of the reactor tubes 7.

The heat carrier feed pipe 201 extends centrally and vertically through the lower reactor head 25 to which it has been welded at the works. Outside of the reactor head 25, the feed pipe 201 extends horizontally, being bent at a right angle.

The heat carrier discharge pipe 202, too, extends centrally and vertically but through the upper reactor head 24 to which it has been welded at the works. This pipe is provided with compensation means 207 inside the upper reactor head 24 so as to equalize variations in length caused by thermal loading.

In the embodiment shown, the tube bundle reactor 5 is composed of subassemblies as follows:

A first subassembly 2 comprises the lower reactor head 25, including the heat carrier feed pipe 201 connected to the same and two nozzles fastened to the reactor head 25—a gas outlet nozzle 26 and an access nozzle 29—as well as a supporting means 30 secured to the reactor head 25 for support of the fully assembled tube bundle reactor 5.

The first subassembly 2 further comprises the complete reactor shell 15 welded to the lower reactor head 25. A continuous bearing ring 19*a* is formed at the inside wall 20 of the reactor shell 15 near the lower reactor head 25. The bearing ring 19*a* is designed to receive a shoulder 33 formed at the outer edge 18 of lower tube sheet sectors and tube sheet portions 104, respectively. The bearing ring 19*a* is formed with a vertical lip 32, such as illustrated in FIGS. 1*a*, 1*b*, or 3*c*. Below the bearing ring 19*a*, in this first subassembly 2, a cross of ribs 208 is fixed to the inside wall 20 and its center is welded to the outside of the feed pipe 201. Its upper edge 209 presents a bearing surface for lower tube sheet sectors 104 of tube bundle subassemblies. The configuration of the ribs 208 is that of an inverted T (in correspondence with FIG. 5*a*).

In addition, the feed pipe 201 is provided at its end opening into the tube bundle 6 with a central bearing ring 210 having a radially outwardly protruding step 211 on which to place the shoulders 213 defined at inner edges 212 of tube sheet sectors 104. The interior cross section of the central bearing ring 210 corresponds to that of the feed pipe 201.

The first subassembly 2 also includes that part of the upper reactor head 24 that has a cylindrical wall in axial continuation of the reactor shell 15.

The second to fifth subassemblies 100, 3*a*-3*d* each comprise a 90° sector of the tube bundle 6, including the respective upper and lower tube sheet sectors 103, 104 fastened to the same.

The lower tube sheet sectors 104 are provided at their outer peripheral edges 18 with the shoulders 33 mentioned above to be placed on the bearing ring 19*a* which is mounted on the reactor shell 15. Radially inwardly, the tube sheet sectors 104 have concave inner edges 212 of circular arc shape formed with the shoulder 213 already mentioned to be supported by the central bearing ring 210.

With the embodiment of FIG. 9, therefore, the feed pipe 201 forms part of the supporting means 19 for the lower tube sheet 104.

At the works, an elastic sealing means 34, such as shown in FIG. 3a, is welded to the upper side 12 of the upper tube sheet sectors 103 near the outer peripheral edges 18 thereof. When the tube bundle subassemblies 100 and 3a-3d, respectively, have been inserted, the sealing means 34 may be connected tightly to the reactor shell 15 by an assembly welding seam 36.

The upper tube sheet portions and sectors 103, respectively, are formed at their radially inner edges 215 with a flange 216 configured similar to the one illustrated in FIG. 6d but being flush with the upper side 12 of the tube sheet sectors 103. The thickness of the flange 216 is reduced as compared to that of the tube sheet sectors 103 so that the structural members, having been connected by welding, need not undergo heat treatment subsequent to the welding step in accordance with the relevant regulations. When the tube bundle subassemblies 3a-3d have been put together the inner edges 215 of the upper tube sheet sectors 103 may be moved into abutment against the discharge pipe 202 and connected to the outside thereof by an assembly welding seam 217.

A sixth subassembly 4 which corresponds to the third subassembly shown in FIG. 1a includes the vaulted upper part of the upper reactor head 24 with the heat carrier discharge pipe 202 fastened to it and two nozzles likewise fastened to it, namely a gas inlet nozzle 27 and an access nozzle 29.

The subassemblies 2, 3a-3d, 4 are assembled as follows:

To begin with, the first subassembly 2 is erected vertically so that the lower reactor head 25 will be at the lower end and the first subassembly 2 positioned on the supporting means 30.

Thereupon, the four tube bundle subassemblies and sectors 3a-3d, respectively, are inserted into the first subassembly 2 one after the other such that the lower tube sheet sectors 104 come to lie not only on the outer bearing ring 19a but also on the central bearing ring 210 along their shoulders 213, and on the ribs 208 as well. The vertical lips 32 formed at the outer bearing ring 19a are connected pressure tightly to the bottom side of the tube sheet sectors 104 by means of an assembly welding seam 35. Furthermore, the lower tube sheet segments 104 are connected pressure tightly to the central bearing ring 210 and the ribs 208 at their bottom sides 13 by means of an assembly welding seam 218. The sealing means 34 which are provided on the upper side 12 of the upper tube sheet segments 103 are connected pressure tightly to the inside wall 20 of the reactor shell 15 and the upper reactor head 24, respectively, by means of an assembly welding seam 36.

Next, the sixth subassembly 4 is positioned on the upper edge 37 of the first subassembly 2 and connected to the same by assembly welding seam 38. If necessary, this assembly welding seam 38 is heat treated. Once the sixth subassembly 4 has been positioned on the first subassembly 2, the radially inwardly located flanges 216 of the upper tube sheet portions 103 are connected pressure tightly by means of an assembly welding seam 217 to the outside wall of the discharge pipe 202 at the end opening into the tube bundle 6.

If desired or necessary, the heat carrier discharge pipe 202 may have been divided, at the works, in horizontal direction within the upper reactor head 24 and then will be welded together at the construction site by an assembly welding seam 219.

All the assembly welding seams, perhaps with the exception of the assembly welding seam 38 between the first and sixth subassemblies 2 and 4 if necessary, are designed as welding seams without need for heat treatment.

Figure 10A:
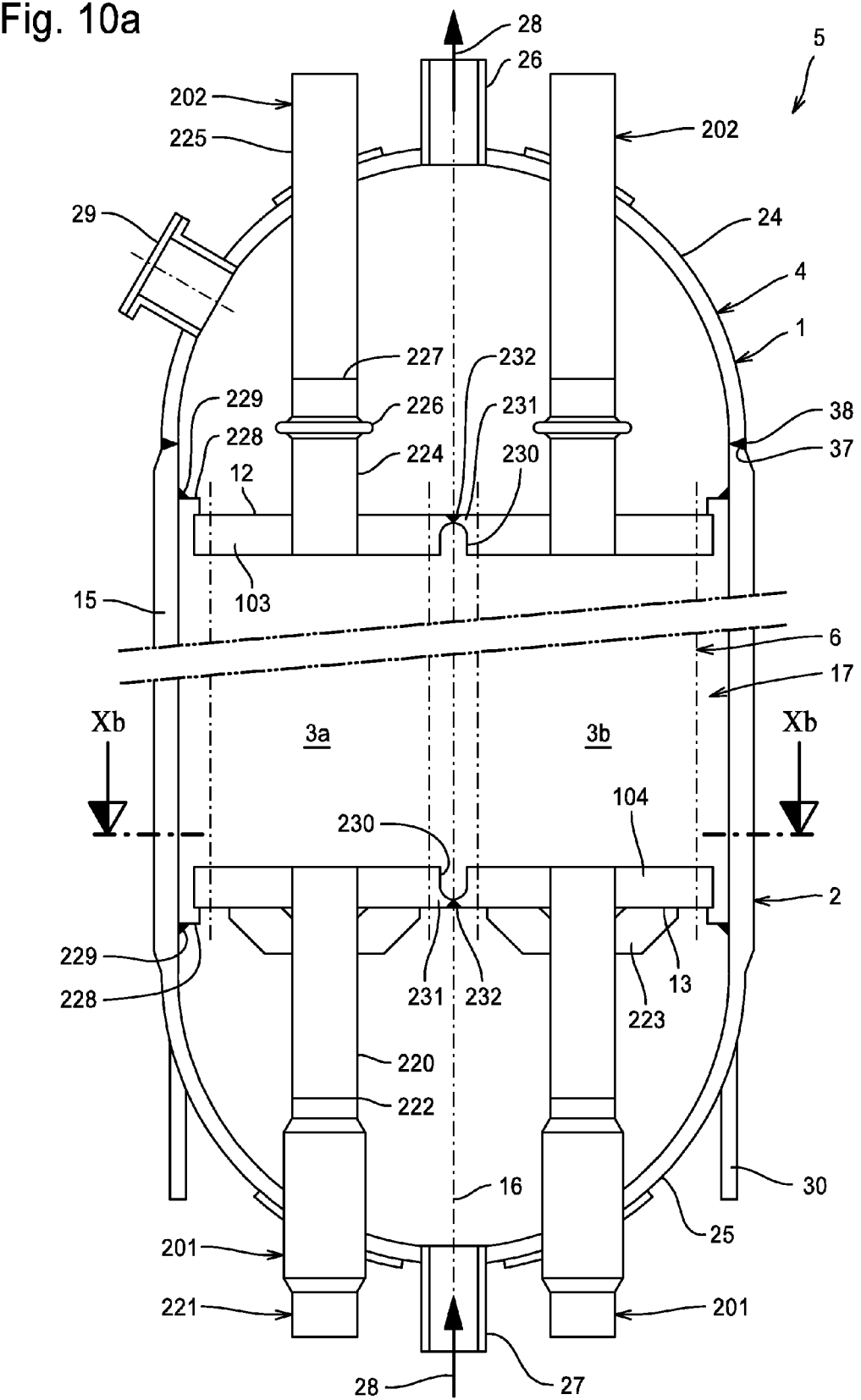
FIG. 10a is a longitudinal sectional elevation of a third embodiment of a tube bundle reactor according to the invention, comprising four decentralized, symmetrically arranged inlet and outlet lines each for the heat carrier.
Figure 10B:
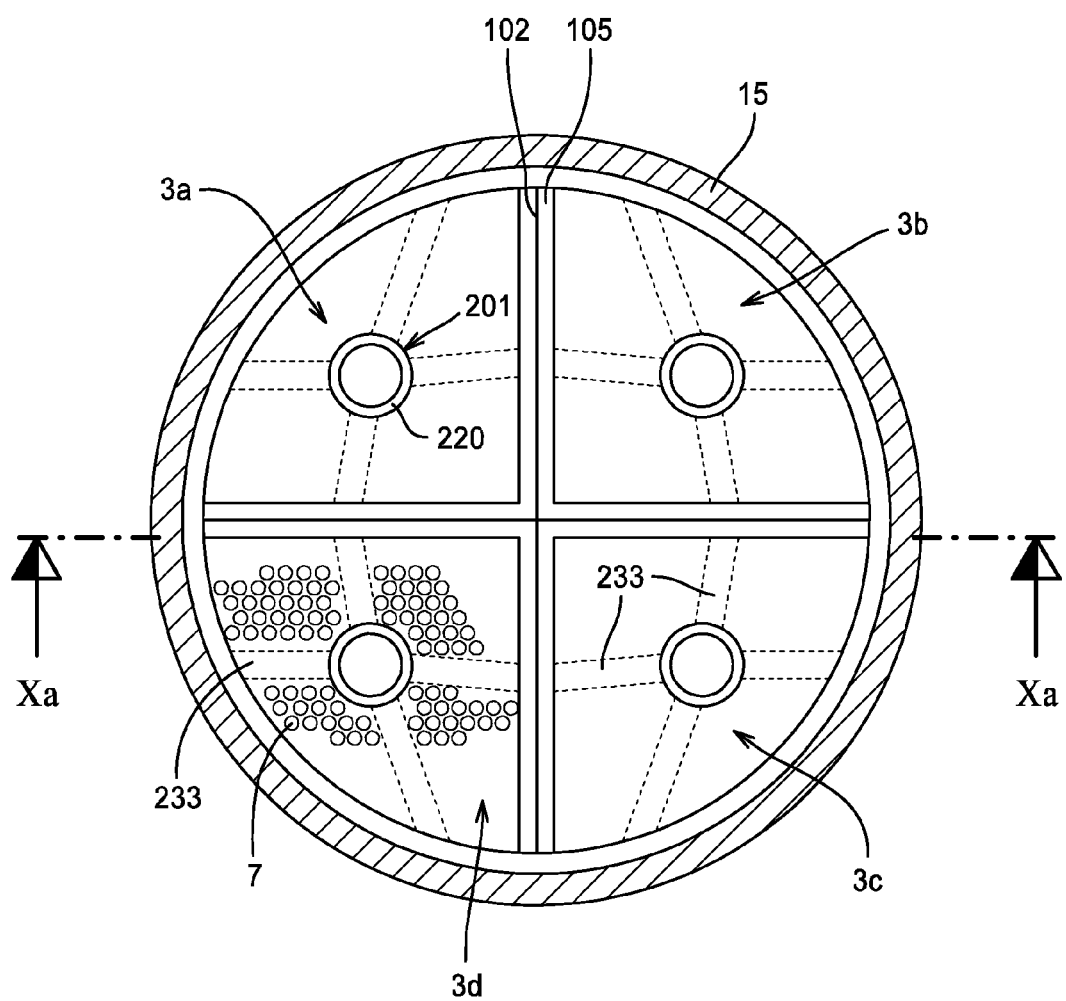

FIGS. 10a and 10b show a tube bundle reactor 5 similar to the one of FIG. 9, but comprising four feed pipes 201 and four discharge pipes 202 each for the heat carrier 23 extending through the lower and upper tube sheets 104, 103 as well as the lower and upper reactor heads 25, 24. This embodiment likewise comprises four sector-like tube bundle subassemblies 100 and 3a-3d, the sector angle being 90°. In each of the tube bundle sectors 3a-3d, one feed pipe 201 each opens into the lower tube sheet sector 104 and one discharge pipe 202 each into the upper tube sheet sector 103. Each feed pipe 201 presents vertical support for the associated tube bundle sector 3a-3d.

For configuring the subassemblies 3a-3d, each feed pipe 201 and each discharge pipe 202 is horizontally split in the respective reactor head 25, 24.

At the works, the end piece 220 of the feed pipe 201 opening into the tube bundle 6 is welded to the respective lower tube sheet sector 104. The next piece 221 of pipe length passes through the lower reactor head 25 to which it is welded at the works. After introduction of the tube bundle subassemblies 3a-3d into the shell/head subassembly 2, the end pieces 220 are connected to the respective next pipe pieces 221 by an assembly welding seam 222.

Reinforcing ribs 223 extending between the outer sides of the end pieces 220 and the bottom sides 13 of the tube sheet sectors 104 have been welded to them at the works.

Also the end pieces 224 of the discharge pipes 202 opening into the tube bundle 6 are welded to the respective upper tube sheet sector 103 at the works. The next pieces 225 of pipe length pass through the upper reactor head 24 to which they are welded at the works. The end pieces 224 already include the compensation means 226. When the head subassembly 4 has been positioned on the shell/head subassembly 2, the end pieces 224 are connected to the respective next pipe pieces 225 by an assembly welding seam 227.

The sealing means 228 between the reactor shell 15 and the lower and upper tube sheets 104, 103 correspond to the embodiment shown in FIG. 3a in rectangular configuration. They are welded at the works to the bottom side 13 of the lower tube sheet 104 and to the upper side 12 of the upper tube sheet 103, respectively, and will be connected pressure tightly to the reactor shell 15 at the construction site by an assembly welding seam 229.

Both the lower and upper tube sheet sectors 104, 103 are formed at their radially inner edges 330 with flanges 231 having a thickness which is smaller than that of the tube sheets 104, 103. They are connected to the tube sheet sectors 104, 103 by an assembly welding seam 232. In the case of the lower tube sheet sectors 104, the flanges 231 are flush with the bottom side 13, while they are flush with the upper side 12 in the case of the upper tube sheet sectors 103.

Supply and discharge of the reaction gas 28 is accomplished by a central gas inlet nozzle 27 into the lower reactor head 25 and by a central gas outlet nozzle 26 from the upper reactor head 24, respectively. The upper reactor head 24 comprises an access nozzle 29, just like the lower reactor head 25.

As may be gathered from FIG. 10b, passageways 105 free of tubes extend along the edges of division 102 of the tube bundle sectors 100 and 3a-3d, respectively. Each tube bundle sector as may be gathered from FIG. 10b, passageways 105 free of tubes extend along the edges of division 102 of the tube bundle sectors 100 and 3a-3d, respectively. Each tube bundle sector 3a-3d, in addition, is designed to have four more tube-free passageways 233 extending in star-like fashion from the respective feed and discharge pipes 201, 202 of the tube bundle sector 3a-3d.

Figure 11:
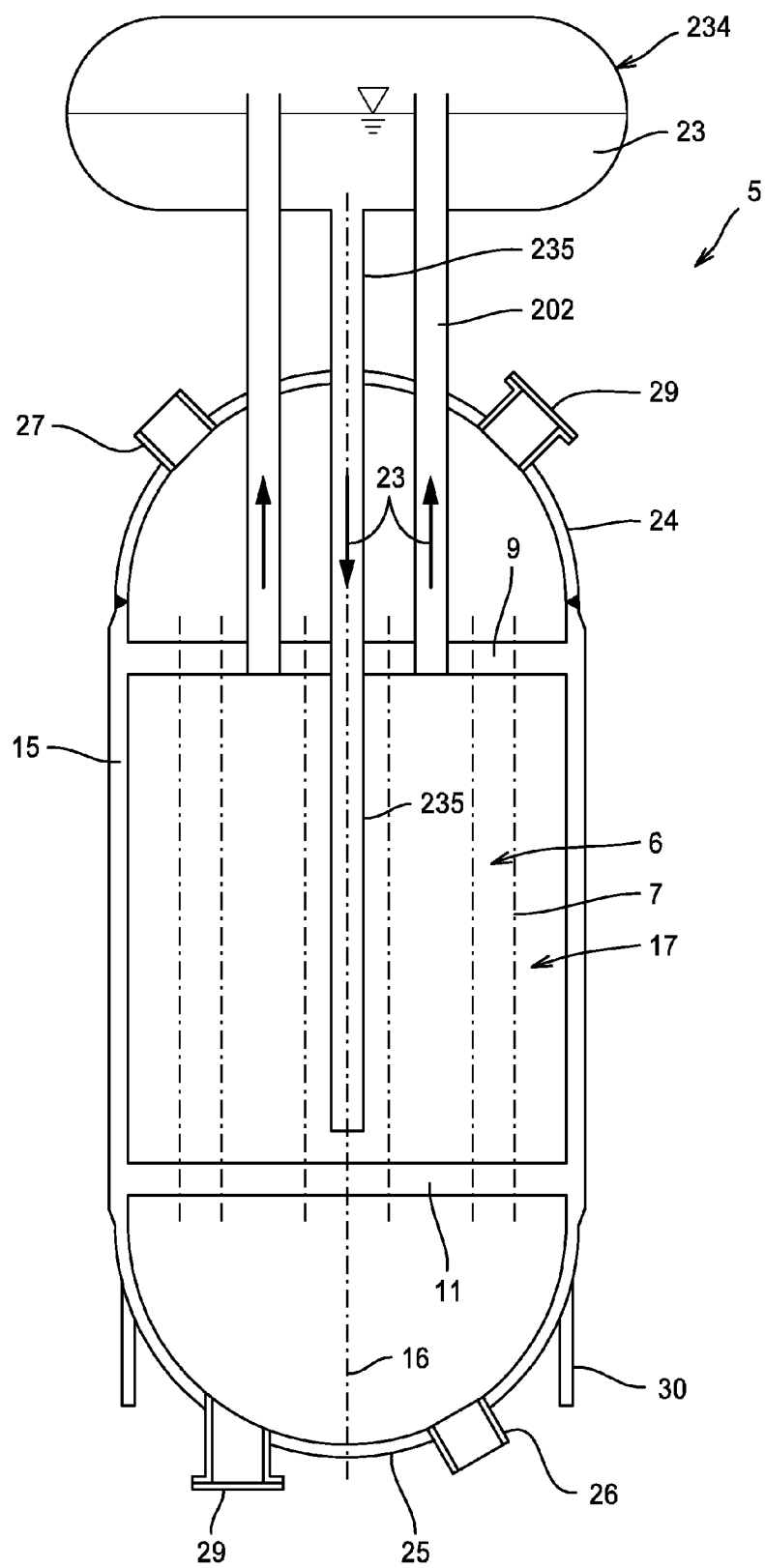
FIG. 11 is a longitudinal sectional elevation of a fourth embodiment of a tube bundle reactor according to the invention, comprising a steam drum.

Just like the tube bundle reactor according to FIG. 10a, also the tube bundle reactor 5 illustrated in FIG. 11 comprises four discharge pipes 202 opening into the upper tube sheet 9 and exiting from the upper reactor head 24. The heat carrier 23 flows around the reactor tubes 7 and evaporates at least partly. The resulting liquid-steam mixture rises through the discharge pipes 202.

The discharge pipes 202 not only open into a steam drum 234 disposed above the reactor head 24 they also provide means of support for the same. A downcomer 235 extends from the steam drum 234 centrally and vertically through the upper reactor head 24 and through the upper tube sheet 9 down to just above the lower tube sheet 11. Liquid heat carrier 23 flows from the steam drum 234 through this downcomer 235 back into the pressure vessel and heat carrier space 17, respectively, between the tube sheets 9, 11.

The tube sheets 9, 11 of the embodiment shown are fastened to the reactor shell 15 throughout their thickness. This means that the tube bundle reactor 5 is not assembled of subassemblies according to the invention but instead fabricated entirely at the works. Nevertheless it is readily possible to produce such tube bundle reactors 5 as subassembly according to the invention, similar to what is shown in FIG. 9. With the embodiment according to FIG. 11, the feed pipe that passes through the lower reactor head is dispensed with and replaced instead by the downcomer 235.

Here, too, the lower and upper reactor heads 25, 24 are provided each with gas inlet and gas outlet nozzles 27, 26, respectively, and with an access nozzle 29.

Figure 12A:
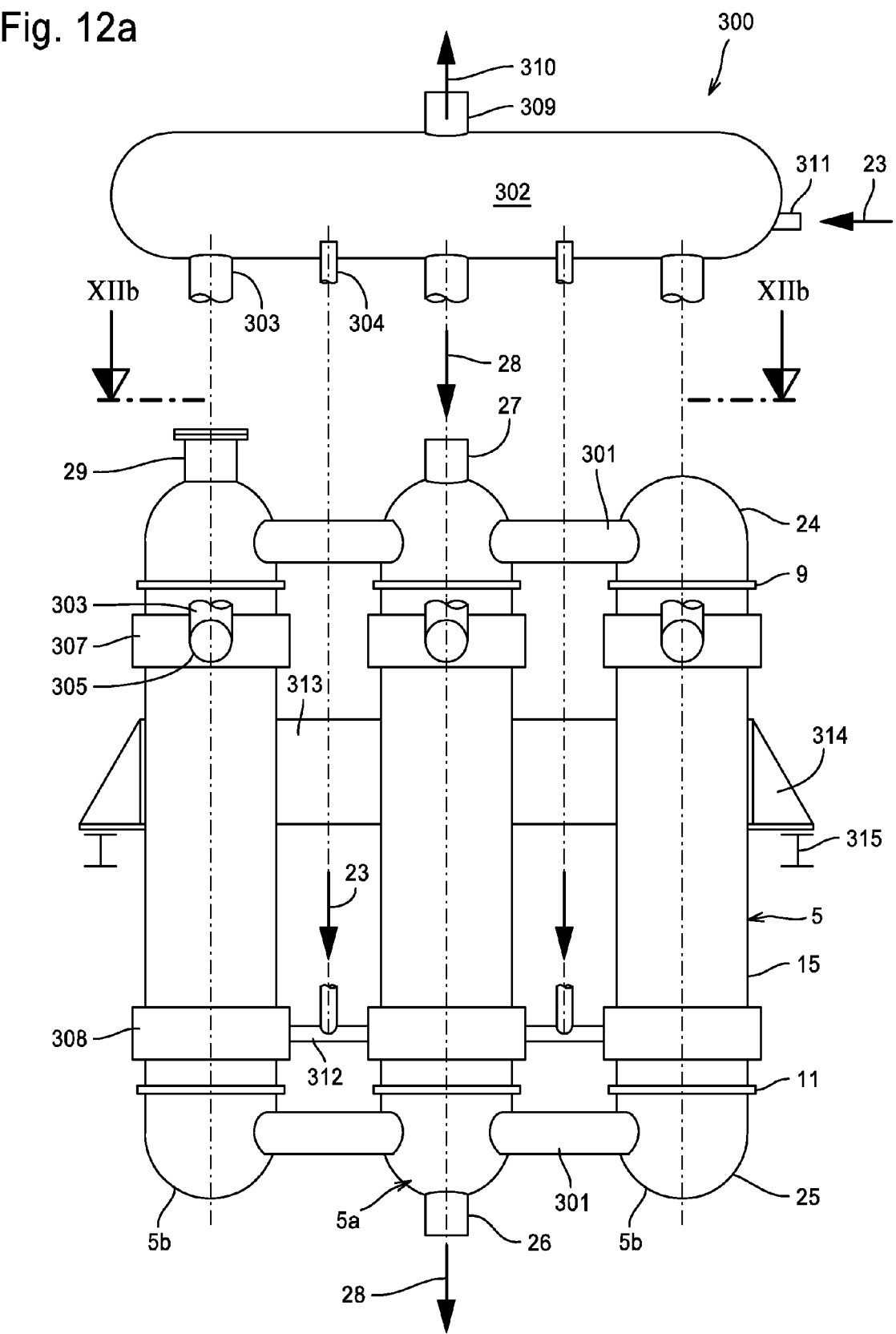
FIG. 12a is a longitudinal sectional elevation of a first embodiment of an arrangement of tube bundle reactors according to the invention, as seen along line XIIa-XIIa in FIG. 12b.
Figure 12B:
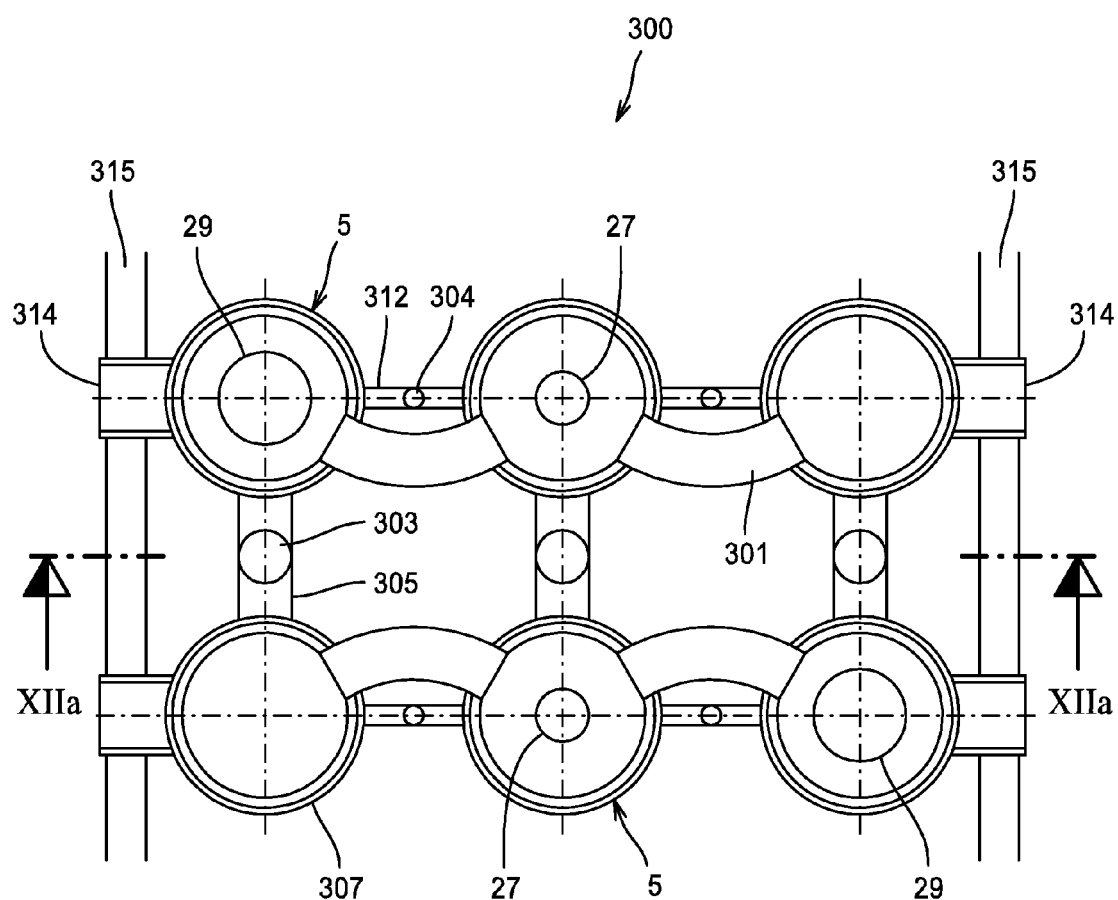
FIG. 12b is a top plan view of the arrangement shown in FIG. 12a, along line XIIb-XIIb.

FIGS. 12a and 12b as well as 13a and 13b each show arrangements 300 of pluralities of tube bundle reactors 5. Each one of these tube bundle reactors 5 is completed in itself and operable as such, including a bundle of vertical, catalyst-filled reactor tubes. The ends of the reactor tubes are fastened pressure tightly in upper and lower tube sheets 9, 11. A reactor shell 15 encloses the tube bundle and is connected pressure tightly to the tube sheets 9, 11, whereby the reactor shell 15 together with the tube sheets 9, 11 forms a pressure vessel. Liquid heat carrier 23 circulates under pressure around the reactor tubes, while evaporating in part. The tube sheets 9, 11 each are spanned by a reactor head 24, 25 connected to the reactor shell 15 and in fluid communication with the reactor tubes. One of the reactor heads, the upper reactor head 24 in the embodiment shown, constitutes a gas inlet head and the other one, here the upper reactor head 25, constitutes a gas outlet head.

As regards dimensions and weight, each tube bundle reactor 5 presents an individual transportable unit and subassembly, respectively, of the arrangement 300.

Once assembled to form an arrangement 300 according to the invention, the respective gas inlet and gas outlet heads 24, 25 of adjacent tube bundle reactors 5 are interconnected by short pipes 301. One or more of the gas inlet and gas outlet heads 24, 25 is/are connected to gas supply and gas discharge lines, respectively, (not shown) which lead into and out of the arrangement 300, respectively.

Above the arrangement 300, there is disposed a steam drum 302 in fluid communication not only with each discharge pipe 303, 305 for liquid-steam mixtures 23 coming from each of the tube bundle reactors 5 but also with each feed pipe 304, 312 for liquid heat carrier 23 leading to the tube bundle reactors.

In FIGS. 12a and 12b an arrangement 300 is shown which comprises six tube bundle reactors 5 disposed in two parallel rows of three each. The gas inlet and gas outlet heads 24, 25 of the two tube bundle reactors 5a in the middle of these two rows of three are provided, in their crown zones, with inlet and outlet nozzles 27, 26 suitable for connection to external gas inlet and gas outlet lines, i.e. lines which come from outside and lead to the outside, respectively. The gas inlet and gas outlet heads 24, 25 of the respective outer tube bundle reactors 5b of the rows of three are connected by short pipes 301 to the gas inlet and gas outlet heads 24, 25, respectively, of the tube bundle reactor 5a in the middle of their row of three. Thus the gas 28 supplied may flow from the middle gas inlet head 24 to the two outer gas inlet heads 24, and the reacted gas 28 may flow back from the two outer gas outlet heads 25 to the gas outlet head 25 in the middle.

The expression "short pipe" is used to express that this particular pipe 301 is a direct link between the reactor heads 24, 25 stretching with the shortest length and without any detours across the distance between them.

In each row of three, i.e. each row of tube bundle reactors 5 whose reactor heads 24, 25 are interconnected by short pipes 301, one gas inlet head 24 and one gas outlet head 25 includes an access pipe end 29 each through which a person may enter the reactor head 24, 25.

The cross sectional dimension of the short pipes 301 between the reactor heads 24, 25 corresponds at least to that of a manhole. A person thus also may enter the other reactor heads 24, 25 of the row by passing through these short pipes 301. That permits maintenance and/or repair work to be done in the tube bundle reactors 5 without having to remove the reactor heads 24, 25 or having to equip each reactor head 24, 25 with its own access nozzle.

The pressure vessels of the tube bundle reactors 5 filled with liquid, evaporating heat carrier 23 likewise are connected to each other by piping 305, 312. Each tube bundle reactor 5 comprises an upper ring channel 307 for discharging the liquid-steam mixture and a lower ring channel 308 for supplying the liquid heat carrier 23. The ring channels 307, 308 are mounted at the outside of the reactor shell 15 and in fluid communication with the pressure vessels inside the reactor shell 15 through openings uniformly distributed across the circumference.

The respective opposite upper ring channels 307 of the two rows of three are in fluid communication with each other through heat carrier discharge pipes 305. A riser 303 each opens into the three heat carrier discharge pipes 305. The upper ends of these risers open into the steam drum 302, and the resulting liquid-steam mixture flows through them from the respective two connected tube bundle reactors 5 and into the steam drum 302.

The risers 303, at the same time, constitute the vertical supports for the steam drum 302.

The liquid is separated from the steam in the steam drum 302. At its upper surface, the steam drum 302 includes an outlet 309 for steam 310. An inlet 311 for liquid heat carrier 23 opens horizontally into the steam drum 302 and it may function, at the same time, as horizontal support for the steam drum 302.

The lower ring channels 308 of the two outer tube bundle reactors 5b are in fluid communication, through heat carrier feed pipes 312, with the lower ring channel 308 of the middle tube bundle reactor 5a of the same row of three. A downcomer 304 each opens into each of these four heat carrier feed pipes. The upper ends of these downcomers 304 open into the steam drum 302, and liquid heat carrier 23 flows through them from the steam drum 302 and back into the tube bundle reactors 5.

The tube bundle reactors 5 are mechanically connected by a fastening structure 313 so as to form one unit. Bearing brackets 314 mounted on the unit allow the unit to be supported by a support structure 315. In the instant case the bearing brackets 314 rest on horizontal beams 315.

Figure 13A:
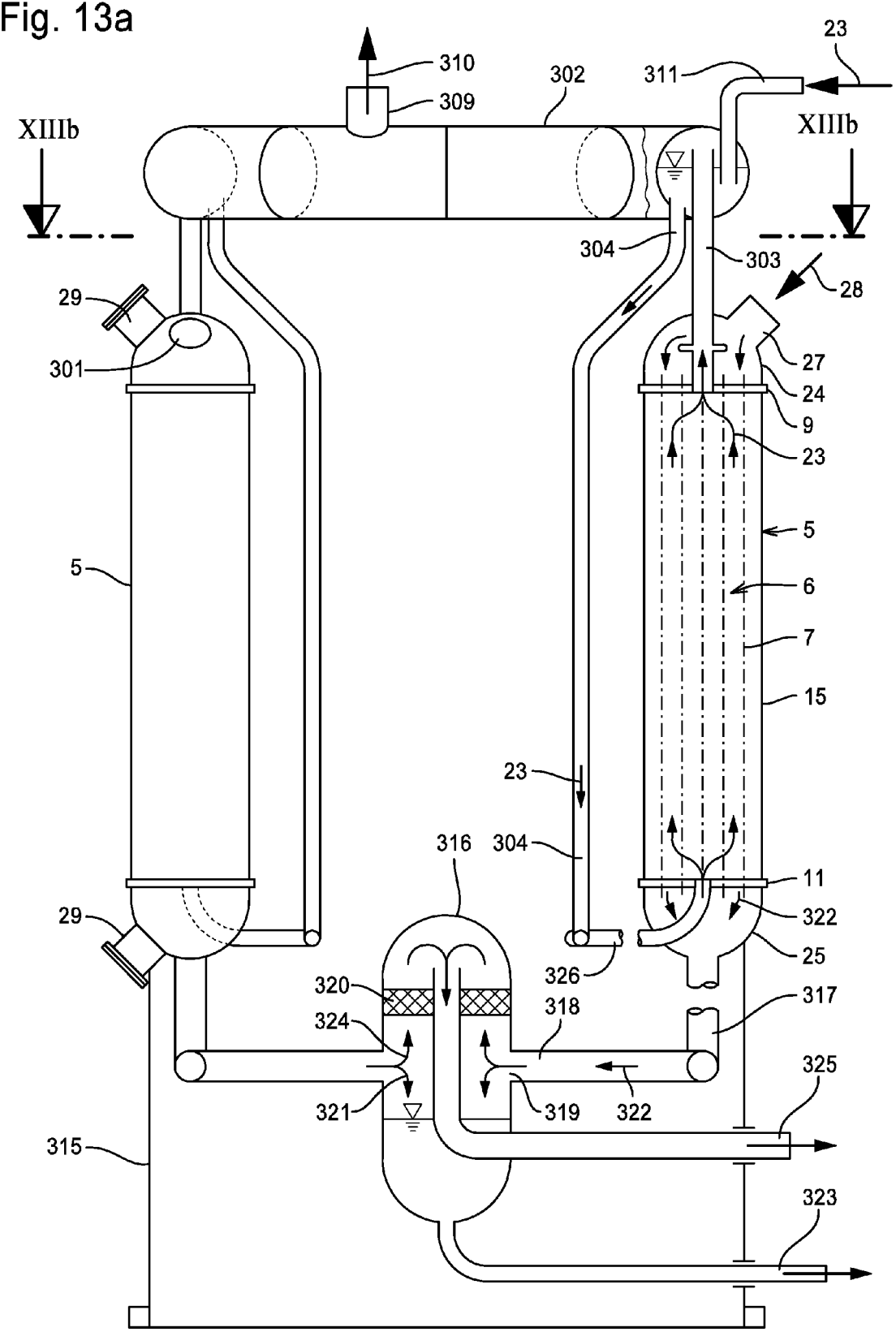
FIG. 13a is a longitudinal sectional elevation of a second embodiment of an arrangement of tube bundle reactors according to the invention, as seen along line XIIIa-XIIIa in FIG. 13b, showing only the two outermost tube bundle reactors for reasons of clarity.
Figure 13B:
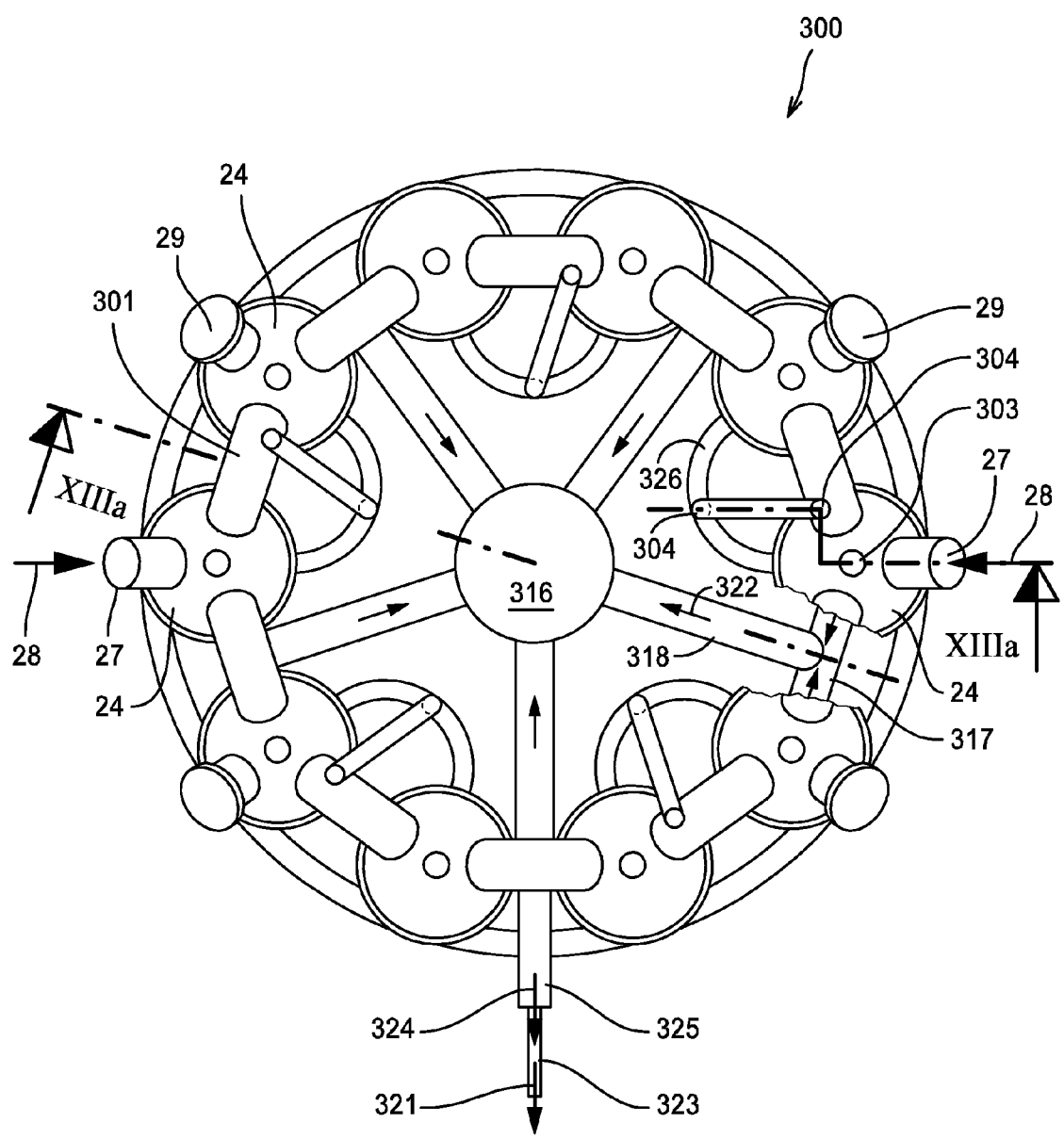
FIG. 13b is a top plan view of the arrangement shown in FIG. 13a, along line XIIIb-XIIIb.

The embodiment of the arrangement 300 according to the invention presented in FIGS. 13a and 13b comprises ten tube bundle reactors 5 arranged in a circle. The design of the tube bundle reactors 5 corresponds substantially to the embodiment shown in FIG. 9. The tube bundle reactors 5, however, have their dimensions and weight selected such that they are transportable and, therefore, fully mounted at the works.

The gas inlet heads 24, i.e. the upper reactor heads of two diametrically opposed tube bundle reactors 5 each comprise a gas inlet nozzle 27 suitable for connection to an external gas supply line.

Gas inlet heads 24 located next to one another are interconnected by short pipes 301. Some of the gas inlet heads 24—four in the embodiment shown—comprise access nozzles 29 through which a person may enter the gas inlet head 24. Here, too, the cross section of the short pipes 301 is at least as great as that of a manhole so that a person may get through the short pipes 301 from one gas inlet head 24 to the next, as with the embodiment according to FIGS. 12a and 12b.

A gas collecting vessel 316 is disposed centrally in the arrangement 300, at the level of or below the gas outlet heads 25, i.e. the lower reactor heads. Mutually adjacent gas outlet heads 25 are interconnected by gas outlet lines 317, and a gas collecting line 318 each leads from each gas outlet line 317 to the gas collecting vessel 316.

The gas collecting vessel 316 is designed like a separator, including a filter 320 in its interior above the openings 319 of the gas collecting lines 318. Liquid components 321 of the reacted gas 322 are separated and collected in the lower part of the separator 316, the liquid 321 being withdrawn from that region through a liquid outlet line 323. The gaseous components 324 flow in upward direction through the filter 320 to be carried off by a gas outlet line 325.

In view of the fact that the gas outlet heads 25 of the instant embodiment are not interconnected by piping of manhole diameter, each gas outlet head 25 is provided with an access nozzle 29 of its own, as shown, for example, in FIG. 13a with the left tube bundle reactor 5

A common steam drum 302 shaped like a ring is disposed above the tube bundle reactors and connected to each tube bundle reactor 5 via a respective riser 303. The riser 303 extends through the upper tube sheet 9 into the gas inlet head 24 of the respective reactor 5. The liquid-steam mixture 23 rises from the tube bundle reactors 5 through the riser 303 into the steam drum 302. With this design, too, the risers 303 present the vertical support of the steam drum 302.

Moreover, a downcomer 304 leads from the steam drum 302 to two adjacent tube bundle reactors 5 each in the interior of the circular arrangement 300. At the level of the gas outlet heads 25, the downcomer 304 branches into two heat carrier distributing lines 326. These two heat carrier distributing lines 326 lead to the respective adjacent tube bundle reactors 5, pass through the gas outlet head 25, and open into the lower tube sheet 11 of the respective tube bundle reactor 5. Liquid heat carrier 23 flows from the steam drum 302 back through these downcomers 304 and distributing lines 326 to return into the tube bundle reactors 5.

At its upper surface, the steam drum 302 includes an outlet 309 for steam 310. Moreover, the steam drum 302 is supplied with liquid heat carrier 23 through a heat carrier feed pipe 311.

All the tube bundle reactors 5 of this arrangement 300 likewise are fastened to each other to form a mechanical unit and they stand on a common support structure 315.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A set of prefabricated tube bundle reactor subassemblies to be assembled at a construction site to provide a tube bundle reactor for carrying out catalytic gas phase and/or liquid phase reactions, the tube bundle reactor comprising a bundle of vertical reactor tubes having their ends fastened pressure tightly in upper and lower tube sheets and being enclosed by a reactor shell which is connected pressure tightly to the tube sheets so that, together with the tube sheets, the reactor shell forms a pressure vessel, the tube sheets each being spanned by a respective reactor head, the reactor heads being connected to the reactor shell, and the reactor tubes being in fluid communication with the reactor heads, the subassembly set comprising:

separate subassemblies (i) for the reactor shell and the reactor heads and (ii) for the tube bundle and the tube sheets;

at least one shell/head subassembly, at least one head subassembly formed by a second reactor head;

at least one tube bundle subassembly formed by the tube bundle together with the attached tube sheets;

wherein, if the at least one shell/head subassembly comprises only one shell/head subassembly, the only one shell/head subassembly is formed by the reactor shell and one reactor head;

wherein, if the at least one shell/head subassembly comprises two or more shell/head subassemblies, at least one shell/head subassembly is formed (i) by the reactor shell or (ii) by one reactor head or (iii) by parts thereof;

wherein the at least one shell/head subassembly and/or the at least one head subassembly comprise supporting means for each tube bundle subassembly designed for vertical support of the tube bundle subassemblies without requiring heat treatment subsequent to their assembly; and wherein the at least one shell/head subassembly and/or the tube sheets comprise sealing means by which the reactor shell and the tube sheets, in the combined state of the subassemblies, are pressure tightly connectable to each other at respective sides remote from the reactor tubes and/or at respective peripheral edges without requiring subsequent heat treatment.

2. The subassembly set as claimed in claim 1, comprising at least two tube bundle subassemblies, each plane of division between two tube bundle subassemblies dividing the tube bundle and tube sheets along the reactor tubes, and the tube sheet portions of the tube bundle subassemblies comprising means at respective edges of division for pressure tightly interconnecting adjacent tube sheet portions without heat treatment.

3. The subassembly set as claimed in claim 2, wherein each plane of division contains a central axis of the tube bundle.

4. The subassembly set as claimed in claim 2, wherein at least one baffle plate is disposed in each tube bundle subassembly transversely of the reactor tubes which each extend through the tube bundle subassembly, the baffle plate offering horizontal guidance to the reactor tubes and being fixed in position by at least one fixing member which is secured both to the at least one baffle plate and to at least one of the tube sheets.

5. The subassembly set as claimed in claim 4, wherein vertically adjacent baffle plates are secured to each other by at least one fixing member.

6. The subassembly set as claimed in claim 4, wherein the fixing members are embodied by flexurally stiff and shear resistant sheets extending parallel to the reactor tubes, and wherein each sheet next to a tube sheet is perforated.

7. The subassembly set as claimed in claim 1, wherein the supporting means comprise a horizontal bearing ring which either is continuous or divided in circumferential direction, formed at the inside wall of the reactor shell, and adapted to receive a peripheral edge of one of the tube sheets.

8. The subassembly set as claimed in claim 7, wherein the bearing ring is arranged to support the lower tube sheet, and the lower tube sheet is formed at the peripheral edge with a shoulder to be placed on the bearing ring.

9. The subassembly set as claimed in claim 1, wherein the supporting means comprise radially extending ribs which are secured to shell/head and/or head subassemblies, connected to one another in the central area, and adapted to receive one of the tube sheets placed on the ribs in the combined state of the subassemblies.

10. The subassembly set as claimed in claim 9, wherein the ribs are welded to an inside wall of the reactor shell and/or to a reactor head.

11. The subassembly set as claimed in claim 9, wherein a number of ribs equals a number of tube bundle subassemblies.

12. The subassembly set as claimed in claim 11, wherein, with the subassemblies in combined state, the ribs extend below the edges of division of the tube bundle subassemblies.

13. The subassembly set as claimed in claim 3, wherein the tube sheet portions of the tube bundle subassemblies comprise means at respective edges of division for connecting neighbouring tube sheet portions by rigid joints which provide stiffness against forces and moments, without requiring heat treatment.

14. The subassembly set as claimed in claim 1, wherein the supporting means comprise at least one continuous flange at an inside wall of the reactor shell and at least one at a peripheral edge of at least one tube sheet, the flanges being radially opposed, adapted to be connected by welding, and having an axial thickness which allows the flanges to be welded together without heat treatment.

15. The subassembly set as claimed in claim 3, wherein the supporting means comprise a central support near the central axis of the tube bundle.

16. The subassembly set as claimed in claim 15, wherein the central support is an anchor.

17. The subassembly set as claimed in claim 15, wherein the central support is a nozzle.

18. The subassembly set as claimed in claim 1, wherein the sealing means are elastically deformable in radial direction.

19. The subassembly set as claimed in claim 8, wherein the bearing ring is continuous and formed with a vertical, continuous lip radially inwardly of and spaced from the bearing ring, a lower end of the lip being secured to the bearing ring and an upper end adapted to be welded to a bottom side of the lower tube sheet.

20. The subassembly set as claimed in claim 18, wherein the sealing means comprise an arc-shaped lip extending between and being connected to the sides of the tube sheets remote from the reactor tubes and to the reactor shell.

21. A tube bundle reactor for carrying out catalytic gas phase and/or liquid phase reactions, the tube bundle reactor comprising:
a bundle of vertical reactor tubes filled with catalyst, having ends fastened pressure tightly in upper and lower tube sheets, and being enclosed by a reactor shell which is connected pressure tightly to the tube sheets so that, together with the tube sheets, the reactor shell forming a pressure vessel in which a liquid heat carrier under pressure flows around the reactor tubes, reactor heads each spanning a respective tube sheet and being connected to the reactor shell, and the reactor tubes being in fluid communication with the reactor heads,
wherein at least one feed pipe and/or at least one discharge pipe for the heat carrier extend in axial direction through a tube sheet.

22. The tube bundle reactor as claimed in claim 21, wherein the tube bundle comprises tube-free passageways.

23. The tube bundle reactor as claimed in claim 22, wherein the tube-free passageways extend in star-like fashion from the heat carrier feed and/or discharge pipes.

24. The tube bundle reactor as claimed in claim 21, wherein the heat carrier is one which evaporates at least partly, and wherein a steam drum is disposed above the upper reactor head, the at least one discharge pipe extending through the upper tube sheet and the upper reactor head into the steam drum and, at the same time, providing support to the steam drum.

25. The tube bundle reactor as claimed in claim 24, wherein at least one downcomer for the liquid heat carrier extends from the steam drum down into the pressure vessel to above the lower tube sheet.

26. The tube bundle reactor as claimed in claim 21, wherein only one feed pipe and/or only one discharge pipe are provided and located centrally.

27. The tube bundle reactor as claimed in claim 21, wherein at least two feed pipes and/or at least two discharge pipes are provided and positioned symmetrically decentralized.

28. The tube bundle reactor as claimed in claim 21, further comprising a set of prefabricated tube bundle reactor subassemblies, the subassembly set comprising:
separate subassemblies (i) for the reactor shell and the reactor heads and (ii) for the tube bundle and the tube sheets;
at least one shell/head subassembly,
at least one head subassembly formed by a second reactor head;
at least one tube bundle subassembly formed by the tube bundle together with the attached tube sheets;
wherein, if the at least one shell/head subassembly comprises only one shell/head subassembly, the only one shell/head subassembly is formed by the reactor shell and one reactor head;
wherein, if the at least one shell/head subassembly comprises two or more shell/head subassemblies, at least one shell/head subassembly is formed (i) by the reactor shell or (ii) by one reactor head or (iii) by parts thereof;
wherein the at least one shell/head subassembly and/or the at least one head subassembly comprise supporting means for each tube bundle subassembly designed for vertical support of the tube bundle subassemblies without requiring heat treatment subsequent to their assembly; and wherein the at least one shell/head subassembly and/or the tube sheets comprise sealing means by which the reactor shell and the tube sheets, in the combined state of the subassemblies, are pressure tightly connectable to each other at respective sides remote from the reactor tubes and/or at respective peripheral edges without requiring subsequent heat treatment.

29. The tube bundle reactor as claimed in claim 28, wherein each feed pipe and/or each discharge pipe constitute at least part of the supporting means.

30. An arrangement comprising:
at least two closely spaced tube bundle reactors, each tube bundle reactor comprising a bundle of vertical reactor tubes which (i) are filled with catalyst, (ii) have respective ends secured pressure tightly in upper and lower tube sheets, and (iii) are enclosed by a reactor shell connected pressure tightly to the tube sheets so that, together with the tube sheets, the reactor shell forms a pressure vessel in which a liquid heat carrier under pressure flows around the reactor tubes and evaporates at least partly, reactor heads each spanning a respective tube sheet being connected to the reactor shell, and the reactor tubes being in fluid communication with the reactor heads, one of the reactor heads forming a gas inlet head and the other reactor head forming a gas outlet head in fluid communication with gas supply and gas discharge lines, respectively,
wherein the gas inlet and/or gas outlet heads of adjacent tube bundle reactors are connected to each other by short pipes, and a number of gas supply and/or discharge lines leading into and out of the arrangement, respectively, is smaller than a number of tube bundle reactors, and that a common steam drum is disposed above upper reactor heads and in fluid communication with each tube bundle reactor.

31. The arrangement as claimed in claim 30, wherein cross sectional dimensions of the gas supply and/or gas discharge lines and of the short pipes between the reactor heads correspond to dimensions of a manhole.

32. The arrangement as claimed in claim 30, wherein the steam drum is connected to each tube bundle reactor by risers and downcomers, and wherein a number of risers and/or downcomers is smaller than the number of tube bundle reactors.

33. The arrangement as claimed in claim 30, wherein all the tube bundle reactors are fastened to one another to form a mechanical unit and stand on a common substructure.

34. The arrangement as claimed in claim 30, wherein all the tube bundle reactors are surrounded by a common insulating casing.

35. The arrangement as claimed in claim 30, wherein all the tube bundle reactors comprise:
a bundle of vertical reactor tubes filled with catalyst, having ends fastened pressure tightly in upper and lower tube sheets, and being enclosed by a reactor shell which is connected pressure tightly to the tube sheets so that, together with the tube sheets, the reactor shell forming a pressure vessel in which a liquid heat carrier under pressure flows around the reactor tubes, reactor heads each spanning a respective tube sheet and being connected to the reactor shell, and the reactor tubes being in fluid communication with the reactor heads,
wherein at least one feed pipe and/or at least one discharge pipe for the heat carrier extend in axial direction through a tube sheet.

* * * * *